US012777382B2

(12) United States Patent
Abedini et al.

(10) Patent No.: US 12,777,382 B2
(45) Date of Patent: Oct. 27, 2026

(54) MEASUREMENT TIMING CONFIGURATION INDICATIONS BETWEEN NETWORK NODES

(71) Applicant: QUALCOMM Incorporated, San Diego, CA (US)

(72) Inventors: Navid Abedini, Basking Ridge, NJ (US); Naeem Akl, Somerville, NJ (US); Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/659,444

(22) Filed: Apr. 15, 2022

(65) Prior Publication Data

US 2023/0337081 A1 Oct. 19, 2023

(51) Int. Cl.

| | |
|---|---|
| ***H04W 36/00*** | (2009.01) |
| ***H04W 4/02*** | (2018.01) |
| ***H04W 24/10*** | (2009.01) |
| ***H04W 36/32*** | (2009.01) |

(52) U.S. Cl.

CPC ....... *H04W 36/0088* (2013.01); *H04W 4/023* (2013.01); *H04W 24/10* (2013.01); *H04W 36/0061* (2013.01); *H04W 36/32* (2013.01)

(58) Field of Classification Search

CPC . H04W 36/0088; H04W 4/023; H04W 24/10; H04W 36/0061; H04W 36/32

See application file for complete search history.

(56) References Cited

U.S. PATENT DOCUMENTS

| | | | | |
|---|---|---|---|---|
| 6,345,186 B1 * | 2/2002 | Schultz | H04W 36/24 455/439 |
| 2009/0197598 A1 * | 8/2009 | Fischer | H04W 48/10 455/434 |
| 2014/0370908 A1 * | 12/2014 | Lee | H04B 7/024 455/452.1 |
| 2019/0132777 A1 * | 5/2019 | Park | H04W 16/28 |
| 2020/0154446 A1 * | 5/2020 | Yerramalli | H04W 72/23 |
| 2021/0051558 A1 * | 2/2021 | Abedini | H04W 76/10 |

(Continued)

FOREIGN PATENT DOCUMENTS

| | | | |
|---|---|---|---|
| EP | 2387279 A1 * | 11/2011 | H04W 60/04 |
| WO | WO-2009086787 A1 * | 7/2009 | H04W 24/02 |

OTHER PUBLICATIONS

3GPP TS 18.401 V16.5.0 (Apr. 2021) (Year: 2021).*

(Continued)

*Primary Examiner* — Mohammad S Anwar

(74) *Attorney, Agent, or Firm* — Harrity & Harrity LLP/ QUALCOMM Incorporated

(57) ABSTRACT

Various aspects of the present disclosure generally relate to wireless communication. In some aspects, a first network node may receive, from a second network node, a neighbor information communication comprising a measurement timing configuration indication associated with a cell served by the first network node, the cell having a first cell configuration. The first network node may apply a second configuration to the cell based at least in part on the measurement timing configuration indication. Numerous other aspects are described.

30 Claims, 21 Drawing Sheets

1300

(56) References Cited

U.S. PATENT DOCUMENTS

| | | | | |
|---|---|---|---|---|
| 2021/0058917 | A1 | 2/2021 | Abedini et al. | |
| 2021/0227442 | A1 | 7/2021 | Yiu | |
| 2022/0061002 | A1 | 2/2022 | Akl et al. | |
| 2022/0303835 | A1 * | 9/2022 | Palle Venkata | H04W 36/322 |
| 2022/0346044 | A1 * | 10/2022 | Dahlman | H04W 56/0015 |
| 2023/0057211 | A1 * | 2/2023 | Min | H04W 24/10 |
| 2023/0292201 | A1 * | 9/2023 | Ishii | H04W 36/00837 |
| 2024/0163741 | A1 * | 5/2024 | Filin | H04W 36/00833 |

OTHER PUBLICATIONS

Apple: "Email Discussion Summary for [101-bis-e] [211] NR_MG_enh_3", 3GPP TSG-RAN WG4 Meeting # 101-bis-e , R4-2202728, 3rd Generation Partnership Project (3GPP), Mobile Competence Centre, 650, Route Des Lucioles, F-06921, Sophia-Antipolis Cedex, France, vol. RAN WG4, No. Electronic Meeting, Jan. 17, 2022-Jan. 25, 2022, Jan. 24, 2022, 89 Pages, XP052102983, p. 23-p. 24.

Huawei: "Further Discussions on the Content of Serving Cell Info", 3GPP TSG-RAN WG3 NR Ad-Hoc#1801, R3-180357, 3rd Generation Partnership Project (3GPP), Mobile Competence Centre, 650, Route Des Lucioles, F-06921, Sophia-Antipolis Cedex, France, vol. RAN WG3, No. Sophia Antipolis, France, Jan. 22, 2018-Jan. 26-2018, Jan. 13, 2018, pp. 1-5, XP051387573, p. 4.

International Search Report and Written Opinion—PCT/US2023/015667—ISA/EPO—Aug. 14, 2023.

Partial International Search Report—PCT/US2023/015667—ISA/EPO—Jun. 20, 2023.

European Search Report—EP25176984—Search Authority—Munich—Jul. 8, 2025.

* cited by examiner

MEASUREMENT TIMING CONFIGURATION INDICATIONS BETWEEN NETWORK NODES

FIELD OF THE DISCLOSURE

Aspects of the present disclosure generally relate to wireless communication and to techniques and apparatuses for measurement timing configuration indications between network nodes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first network node includes receiving, from a second network node, a neighbor information communication comprising a measurement timing configuration indication associated with a cell served by the first network node, the cell having a first cell configuration; and applying a second configuration to the cell based at least in part on the measurement timing configuration indication.

In some aspects, a method of wireless communication performed by a first network node includes transmitting, to a second network node, a neighbor information communication comprising a measurement timing configuration indication associated with a cell served by the second network node, the cell having a first cell configuration, wherein the measurement timing configuration indicates a second cell configuration; and performing a communication task based at least in part on the second cell configuration.

In some aspects, a method of wireless communication performed by a first network node includes receiving, from a second network node, a neighbor information communication comprising a measurement timing configuration that includes indicates at least one of a synchronization signal block (SSB) measurement timing configuration (SMTC) periodicity or a link type; and performing a communication task based at least in part on the measurement timing configuration.

In some aspects, a method of wireless communication performed by a first network node includes transmitting, to a second network node, a neighbor information communication comprising a measurement timing configuration that includes indicates at least one of an SMTC periodicity or a link type; and performing a communication task based at least in part on the measurement timing configuration.

In some aspects, a method of wireless communication performed by a first network node includes receiving, from a second network node, cell direction information associated with a cell served by the first network node; and performing a communication task based at least in part on the cell direction information.

In some aspects, a method of wireless communication performed by a first network node includes transmitting, to a second network node, cell direction information associated with a cell served by the second network node; and performing a communication task based at least in part on the cell direction information.

In some aspects, a method of wireless communication performed by a first network node includes receiving, from a second network node, cell information associated with a cell served by the second network node, the cell information indicating mobile status information corresponding to the cell; and performing a communication task based at least in part on the mobile status information.

In some aspects, a method of wireless communication performed by a first network node includes transmitting, to a second network node, cell information associated with a cell served by the first network node, the cell information indicating mobile status information corresponding to the cell; and performing a communication task based at least in part on the mobile status information.

In some aspects, a method of wireless communication performed by a first network node includes receiving, from a second network node, a neighbor information communication comprising a measurement timing configuration that includes indicates at least one of an SMTC parameter or an SSB transmission configuration (STC) parameter; and performing a communication task based at least in part on the measurement timing configuration.

In some aspects, a method of wireless communication performed by a first network node includes transmitting, to a second network node, a neighbor information communication comprising a measurement timing configuration that includes indicates at least one of an SMTC parameter or an STC parameter; and performing a communication task based at least in part on the measurement timing configuration.

In some aspects, a method of wireless communication performed by a first network node includes receiving, from a second network node, an over-the-air communication comprising a measurement timing configuration associated with at least one of a cell or the second network node, the measurement timing configuration indicating at least one of an SMTC parameter or an STC parameter; and performing a communication task based at least in part on the measurement timing configuration.

In some aspects, a method of wireless communication performed by a first network node includes transmitting, to a second network node, an over-the-air communication comprising a measurement timing configuration associated with at least one of a cell or the first network node, the measurement timing configuration indicating at least one of an SMTC parameter or an STC parameter; and performing a communication task based at least in part on the measurement timing configuration.

In some aspects, a method of wireless communication performed by a first network node includes receiving, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and performing a communication task based at least in part on the measurement timing configuration.

In some aspects, a method of wireless communication performed by a first network node includes transmitting, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and performing a communication task based at least in part on the measurement timing configuration.

In some aspects, an apparatus for wireless communication at a first network node includes a memory; and one or more processors, coupled to the memory, configured to: receive, from a second network node, a neighbor information communication comprising a measurement timing configuration indication associated with a cell served by the first network node, the cell having a first cell configuration; and apply a second configuration to the cell based at least in part on the measurement timing configuration indication.

In some aspects, an apparatus for wireless communication at a first network node includes a memory; and one or more processors, coupled to the memory, configured to: transmit, to a second network node, a neighbor information communication comprising a measurement timing configuration indication associated with a cell served by the second network node, the cell having a first cell configuration, wherein the measurement timing configuration indicates a second cell configuration; and perform a communication task based at least in part on the second cell configuration.

In some aspects, an apparatus for wireless communication at a first network node includes a memory; and one or more processors, coupled to the memory, configured to: receive, from a second network node, a neighbor information communication comprising a measurement timing configuration that includes indicates at least one of an SMTC periodicity or a link type; and perform a communication task based at least in part on the measurement timing configuration.

In some aspects, an apparatus for wireless communication at a first network node includes a memory; and one or more processors, coupled to the memory, configured to: transmit, to a second network node, a neighbor information communication comprising a measurement timing configuration that includes indicates at least one of an SMTC periodicity or a link type; and perform a communication task based at least in part on the measurement timing configuration.

In some aspects, an apparatus for wireless communication at a first network node includes a memory; and one or more processors, coupled to the memory, configured to: receive, from a second network node, cell direction information associated with a cell served by the first network node; and perform a communication task based at least in part on the cell direction information.

In some aspects, an apparatus for wireless communication at a first network node includes a memory; and one or more processors, coupled to the memory, configured to: transmit, to a second network node, cell direction information associated with a cell served by the second network node; and perform a communication task based at least in part on the cell direction information.

In some aspects, an apparatus for wireless communication at a first network node includes a memory; and one or more processors, coupled to the memory, configured to: receive, from a second network node, cell information associated with a cell served by the second network node, the cell information indicating mobile status information corresponding to the cell; and perform a communication task based at least in part on the mobile status information.

In some aspects, an apparatus for wireless communication at a first network node includes a memory; and one or more processors, coupled to the memory, configured to: transmit, to a second network node, cell information associated with a cell served by the first network node, the cell information indicating mobile status information corresponding to the cell; and perform a communication task based at least in part on the mobile status information.

In some aspects, an apparatus for wireless communication at a first network node includes a memory; and one or more processors, coupled to the memory, configured to: receive, from a second network node, a neighbor information communication comprising a measurement timing configuration that includes indicates at least one of an SMTC parameter or an STC parameter; and perform a communication task based at least in part on the measurement timing configuration.

In some aspects, an apparatus for wireless communication at a first network node includes a memory; and one or more processors, coupled to the memory, configured to: transmit, to a second network node, a neighbor information communication comprising a measurement timing configuration that includes indicates at least one of an SMTC parameter or an STC parameter; and perform a communication task based at least in part on the measurement timing configuration.

In some aspects, an apparatus for wireless communication at a first network node includes a memory; and one or more processors, coupled to the memory, configured to: receive, from a second network node, an over-the-air communication comprising a measurement timing configuration associated with at least one of a cell or the second network node, the measurement timing configuration indicating at least one of an SMTC parameter or an STC parameter; and perform a communication task based at least in part on the measurement timing configuration.

In some aspects, an apparatus for wireless communication at a first network node includes a memory; and one or more processors, coupled to the memory, configured to: transmit, to a second network node, an over-the-air communication comprising a measurement timing configuration associated with at least one of a cell or the first network node, the measurement timing configuration indicating at least one of an SMTC parameter or an STC parameter; and perform a communication task based at least in part on the measurement timing configuration.

In some aspects, an apparatus for wireless communication at a first network node includes a memory; and one or more processors, coupled to the memory, configured to: receive, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, an apparatus for wireless communication at a first network node includes a memory; and one or more processors, coupled to the memory, configured to: transmit, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, a first network node for wireless communication includes a memory; and one or more processors, coupled to the memory, configured to: receive, from a second network node, a neighbor information communication comprising a measurement timing configuration indication associated with a cell served by the first network node, the cell having a first cell configuration; and apply a second configuration to the cell based at least in part on the measurement timing configuration indication.

In some aspects, a first network node for wireless communication includes a memory; and one or more processors, coupled to the memory, configured to: transmit, to a second network node, a neighbor information communication comprising a measurement timing configuration indication associated with a cell served by the second network node, the cell having a first cell configuration, wherein the measurement timing configuration indicates a second cell configuration; and perform a communication task based at least in part on the second cell configuration.

In some aspects, a first network node for wireless communication includes a memory; and one or more processors, coupled to the memory, configured to: receive, from a second network node, a neighbor information communication comprising a measurement timing configuration that includes indicates at least one of an SMTC periodicity or a link type; and perform a communication task based at least in part on the measurement timing configuration.

In some aspects, a first network node for wireless communication includes a memory; and one or more processors, coupled to the memory, configured to: transmit, to a second network node, a neighbor information communication comprising a measurement timing configuration that includes indicates at least one of an SMTC periodicity or a link type; and perform a communication task based at least in part on the measurement timing configuration.

In some aspects, a first network node for wireless communication includes a memory; and one or more processors, coupled to the memory, configured to: receive, from a second network node, cell direction information associated with a cell served by the first network node; and perform a communication task based at least in part on the cell direction information.

In some aspects, a first network node for wireless communication includes a memory; and one or more processors, coupled to the memory, configured to: transmit, to a second network node, cell direction information associated with a cell served by the second network node; and perform a communication task based at least in part on the cell direction information.

In some aspects, a first network node for wireless communication includes a memory; and one or more processors, coupled to the memory, configured to: receive, from a second network node, cell information associated with a cell served by the second network node, the cell information indicating mobile status information corresponding to the cell; and perform a communication task based at least in part on the mobile status information.

In some aspects, a first network node for wireless communication includes a memory; and one or more processors, coupled to the memory, configured to: transmit, to a second network node, cell information associated with a cell served by the first network node, the cell information indicating mobile status information corresponding to the cell; and perform a communication task based at least in part on the mobile status information.

In some aspects, a first network node for wireless communication includes a memory; and one or more processors, coupled to the memory, configured to: receive, from a second network node, a neighbor information communication comprising a measurement timing configuration that includes indicates at least one of an SMTC parameter or an STC parameter; and perform a communication task based at least in part on the measurement timing configuration.

In some aspects, a first network node for wireless communication includes a memory; and one or more processors, coupled to the memory, configured to: transmit, to a second network node, a neighbor information communication comprising a measurement timing configuration that includes indicates at least one of an SMTC parameter or an STC parameter; and perform a communication task based at least in part on the measurement timing configuration.

In some aspects, a first network node for wireless communication includes a memory; and one or more processors, coupled to the memory, configured to: receive, from a second network node, an over-the-air communication comprising a measurement timing configuration associated with at least one of a cell or the second network node, the measurement timing configuration indicating at least one of an SMTC parameter or an STC parameter; and perform a communication task based at least in part on the measurement timing configuration.

In some aspects, a first network node for wireless communication includes a memory; and one or more processors, coupled to the memory, configured to: transmit, to a second network node, an over-the-air communication comprising a measurement timing configuration associated with at least one of a cell or the first network node, the measurement timing configuration indicating at least one of an SMTC parameter or an STC parameter; and perform a communication task based at least in part on the measurement timing configuration.

In some aspects, a first network node for wireless communication includes a memory; and one or more processors, coupled to the memory, configured to: receive, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, a first network node for wireless communication includes a memory; and one or more processors, coupled to the memory, configured to: transmit, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: receive, from a second network node, a neighbor information communication comprising a measurement timing configuration indication associated with a cell served by the first network node, the cell having a first cell configuration; and apply a second configuration to the cell based at least in part on the measurement timing configuration indication.

In some aspects, a non-transitory computer-readable medium storing a set of instructions for wireless communication includes one or more instructions that, when executed by one or more processors of a first network node, cause the first network node to: transmit, to a second network node, a neighbor information communication comprising a measurement timing configuration indication associated with a cell served by the second network node, the cell having a first cell configuration, wherein the measurement timing configuration indicates a second cell configuration; and perform a communication task based at least in part on the second cell configuration.

In some aspects, a non-transitory computer-readable medium storing a set of instructions for wireless communication includes one or more instructions that, when executed by one or more processors of a first network node, cause the first network node to: receive, from a second network node, a neighbor information communication comprising a measurement timing configuration that includes indicates at least one of an SMTC periodicity or a link type; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: transmit, to a second network node, a neighbor information communication comprising a measurement timing configuration that includes indicates at least one of an SMTC periodicity or a link type; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: receive, from a second network node, cell direction information associated with a cell served by the first network node; and perform a communication task based at least in part on the cell direction information.

In some aspects, a non-transitory computer-readable medium storing a set of instructions for wireless communication includes one or more instructions that, when executed by one or more processors of a first network node, cause the first network node to: transmit, to a second network node, cell direction information associated with a cell served by the second network node; and perform a communication task based at least in part on the cell direction information.

In some aspects, a non-transitory computer-readable medium storing a set of instructions for wireless communication includes one or more instructions that, when executed by one or more processors of a first network node, cause the first network node to: receive, from a second network node, cell information associated with a cell served by the second network node, the cell information indicating mobile status information corresponding to the cell; and perform a communication task based at least in part on the mobile status information.

In some aspects, a non-transitory computer-readable medium storing a set of instructions for wireless communication includes one or more instructions that, when executed by one or more processors of a first network node, cause the first network node to: transmit, to a second network node, cell information associated with a cell served by the first network node, the cell information indicating mobile status information corresponding to the cell; and perform a communication task based at least in part on the mobile status information.

In some aspects, a non-transitory computer-readable medium storing a set of instructions for wireless communication includes one or more instructions that, when executed by one or more processors of a first network node, cause the first network node to: receive, from a second network node, a neighbor information communication comprising a measurement timing configuration that includes indicates at least one of an SMTC parameter or an STC parameter; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: transmit, to a second network node, a neighbor information communication comprising a measurement timing configuration that includes indicates at least one of an SMTC parameter or an STC parameter; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: receive, from a second network node, an over-the-air communication comprising a measurement timing configuration associated with at least one of a cell or the second network node, the measurement timing configuration indicating at least one of an SMTC parameter or an STC parameter; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: transmit, to a second network node, an over-the-air communication comprising a measurement timing configuration associated with at least one of a cell or the first network node, the measurement timing configuration indicating at least one of an SMTC parameter or an STC parameter; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: receive, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, a non-transitory computer-readable medium storing a set of instructions for wireless communication includes one or more instructions that, when executed by one or more processors of a first network node, cause the first network node to: transmit, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, an apparatus for wireless communication includes means for receiving, from a network node, a neighbor information communication comprising a measurement timing configuration indication associated with a cell served by the apparatus, the cell having a first cell configuration; and means for applying a second configuration to the cell based at least in part on the measurement timing configuration indication.

In some aspects, an apparatus for wireless communication includes means for transmitting, to a network node, a neighbor information communication comprising a measurement timing configuration indication associated with a cell served by the network node, the cell having a first cell configuration, wherein the measurement timing configuration indicates a second cell configuration; and means for performing a communication task based at least in part on the second cell configuration.

In some aspects, an apparatus for wireless communication includes means for receiving, from a network node, a neighbor information communication comprising a measurement timing configuration that includes indicates at least one of an SMTC periodicity or a link type; and means for performing a communication task based at least in part on the measurement timing configuration.

In some aspects, an apparatus for wireless communication includes means for transmitting, to a network node, a neighbor information communication comprising a measurement timing configuration that includes indicates at least one of an SMTC periodicity or a link type; and means for performing a communication task based at least in part on the measurement timing configuration.

In some aspects, an apparatus for wireless communication includes means for receiving, from a network node, cell direction information associated with a cell served by the apparatus; and means for performing a communication task based at least in part on the cell direction information.

In some aspects, an apparatus for wireless communication includes means for transmitting, to a network node, cell direction information associated with a cell served by the network node; and means for performing a communication task based at least in part on the cell direction information.

In some aspects, an apparatus for wireless communication includes means for receiving, from a network node, cell information associated with a cell served by the network node, the cell information indicating mobile status information corresponding to the cell; and means for performing a communication task based at least in part on the mobile status information.

In some aspects, an apparatus for wireless communication includes means for transmitting, to a network node, cell information associated with a cell served by the apparatus, the cell information indicating mobile status information corresponding to the cell; and means for performing a communication task based at least in part on the mobile status information.

In some aspects, an apparatus for wireless communication includes means for receiving, from a network node, a neighbor information communication comprising a measurement timing configuration that includes indicates at least one of an SMTC parameter or an STC parameter; and means for performing a communication task based at least in part on the measurement timing configuration.

In some aspects, an apparatus for wireless communication includes means for transmitting, to a network node, a neighbor information communication comprising a measurement timing configuration that includes indicates at least one of an SMTC parameter or an STC parameter; and means for performing a communication task based at least in part on the measurement timing configuration.

In some aspects, an apparatus for wireless communication includes means for receiving, from a network node, an over-the-air communication comprising a measurement timing configuration associated with at least one of a cell or the network node, the measurement timing configuration indicating at least one of an SMTC parameter or an STC parameter; and means for performing a communication task based at least in part on the measurement timing configuration.

In some aspects, an apparatus for wireless communication includes means for transmitting, to a network node, an over-the-air communication comprising a measurement timing configuration associated with at least one of a cell or the apparatus, the measurement timing configuration indicating at least one of an SMTC parameter or an STC parameter; and means for performing a communication task based at least in part on the measurement timing configuration.

In some aspects, an apparatus for wireless communication includes means for receiving, from a network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and means for performing a communication task based at least in part on the measurement timing configuration.

In some aspects, an apparatus for wireless communication includes means for transmitting, to a network node, a measurement timing configuration associated with an SMTC parameter or an STC parameter, wherein the at least one of the SMTC parameter or the STC parameter indicates one or more candidate resources corresponding to an SSB associated with the cell; and means for performing a communication task based at least in part on the measurement timing configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
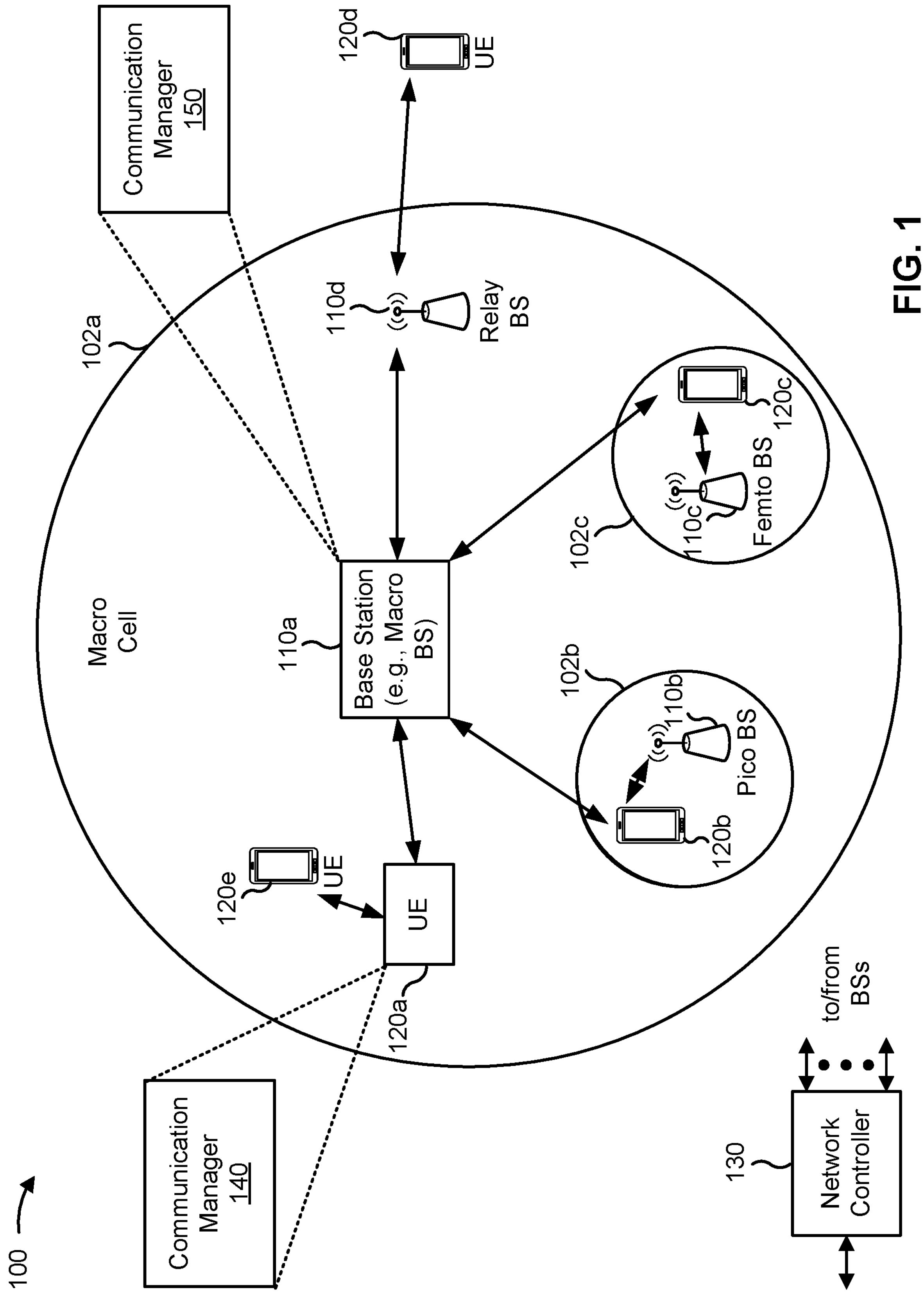
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which also may be referred to as a "node" or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, the first network node may include a communication manager 140 or a communication manager 150. As described in more detail elsewhere herein, the communication manager 140 or 150 may receive, from a second network node, a neighbor information communication comprising a measurement timing configuration indication associated with a cell served by the first network node, the cell having a first cell configuration; and apply a second configuration to the cell based at least in part on the measurement timing configuration indication.

In some aspects, the communication manager 140 or 150 may transmit, to a second network node, a neighbor information communication comprising a measurement timing configuration indication associated with a cell served by the second network node, the cell having a first cell configuration, wherein the measurement timing configuration indicates a second cell configuration; and perform a communication task based at least in part on the second cell configuration.

In some aspects, the communication manager 140 or 150 may receive, from a second network node, a neighbor information communication comprising a measurement timing configuration that includes indicates at least one of a synchronization signal block (SSB) measurement timing configuration (SMTC) periodicity or a link type; and perform a communication task based at least in part on the measurement timing configuration.

In some aspects, the communication manager 140 or 150 may transmit, to a second network node, a neighbor information communication comprising a measurement timing configuration that includes indicates at least one of an SMTC periodicity or a link type; and perform a communication task based at least in part on the measurement timing configuration.

In some aspects, the communication manager 140 or 150 may receive, from a second network node, cell direction information associated with a cell served by the first network node; and perform a communication task based at least in part on the cell direction information.

In some aspects, the communication manager 140 or 150 may transmit, to a second network node, cell direction information associated with a cell served by the second network node; and perform a communication task based at least in part on the cell direction information.

In some aspects, the communication manager 140 or 150 may receive, from a second network node, cell information associated with a cell served by the second network node, the cell information indicating mobile status information corresponding to the cell; and perform a communication task based at least in part on the mobile status information.

In some aspects, the communication manager 140 or 150 may transmit, to a second network node, cell information associated with a cell served by the first network node, the cell information indicating mobile status information corresponding to the cell; and perform a communication task based at least in part on the mobile status information.

In some aspects, the communication manager 140 or 150 may receive, from a second network node, a neighbor information communication comprising a measurement timing configuration that includes indicates at least one of an SMTC parameter or an SSB transmission configuration (STC) parameter; and perform a communication task based at least in part on the measurement timing configuration.

In some aspects, the communication manager 140 or 150 may transmit, to a second network node, a neighbor information communication comprising a measurement timing configuration that includes indicates at least one of an SMTC parameter or an STC parameter; and perform a communication task based at least in part on the measurement timing configuration.

In some aspects, the communication manager 140 or 150 may receive, from a second network node, an over-the-air communication comprising a measurement timing configuration associated with at least one of a cell or the second network node, the measurement timing configuration indicating at least one of an SMTC parameter or an STC parameter; and perform a communication task based at least in part on the measurement timing configuration.

In some aspects, the communication manager 140 or 150 may transmit, to a second network node, an over-the-air communication comprising a measurement timing configuration associated with at least one of a cell or the first network node, the measurement timing configuration indicating at least one of an SMTC parameter or an STC parameter; and perform a communication task based at least in part on the measurement timing configuration.

In some aspects, the communication manager 140 or 150 may receive, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration.

In some aspects, the communication manager 140 or 150 may transmit, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell; and perform a communication task based at least in part on the measurement timing configuration. Additionally, or alternatively, the communication manager 140 or 150 may perform one or more other operations described herein.

As indicated above, FIG. 1 is provided as an example. Other examples may differ from what is described with regard to FIG. 1.

Figure 2:
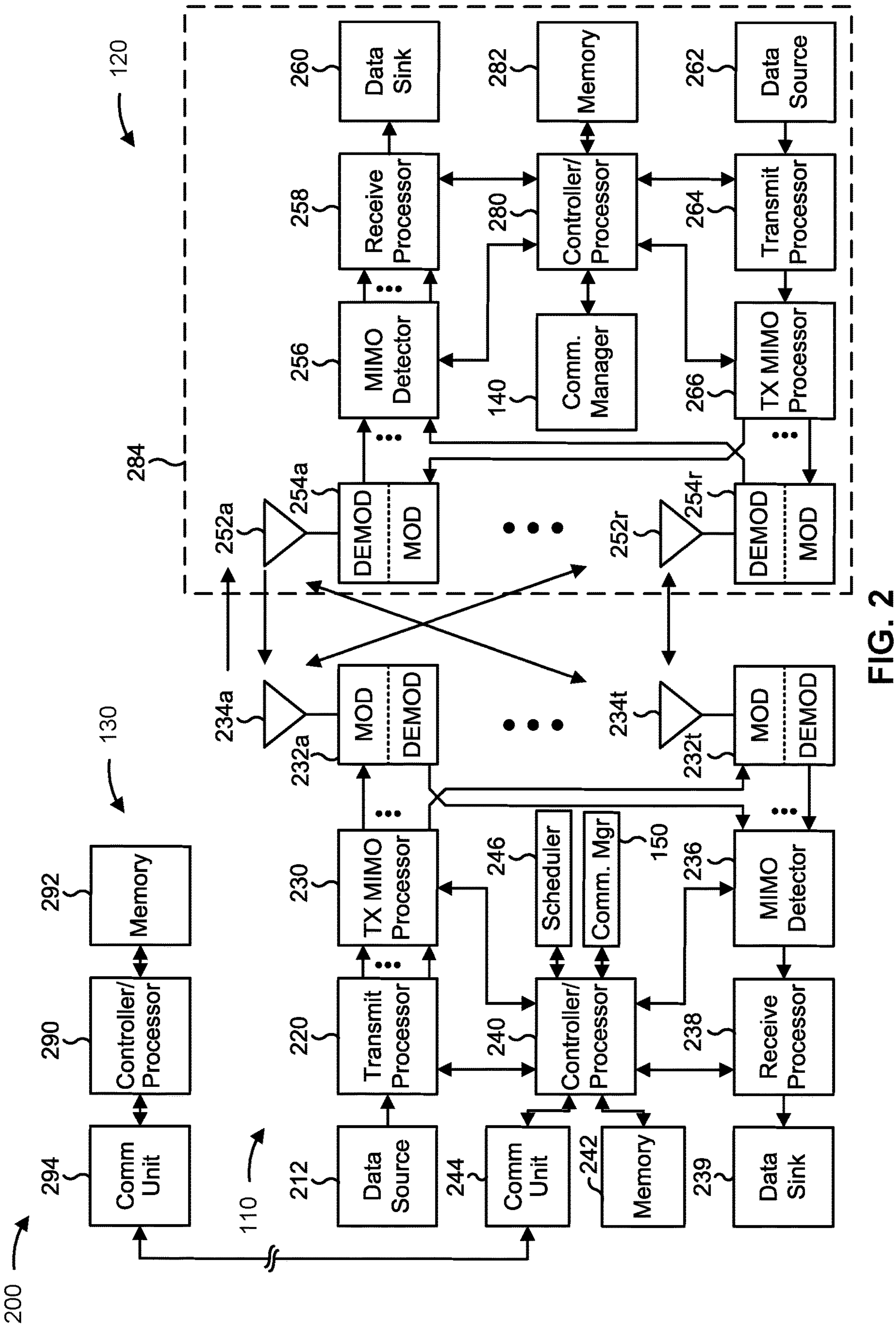
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) radio access network (RAN) Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-21).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-21).

The controller/processor 240 of the base station 110, the controller/processor 280 of the UE 120, and/or any other component(s) of FIG. 2 may perform one or more techniques associated with measurement timing configuration indications between network nodes, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, and/or other processes as described herein. In some examples, executing instructions may include running the instructions, converting the instructions, compiling the instructions, and/or interpreting the instructions, among other examples.

In some aspects, the first network node includes means for receiving, from a second network node, a neighbor information communication comprising a measurement timing configuration indication associated with a cell served by the first network node, the cell having a first cell configuration (e.g., using antenna 234 or 252, modem 232 or 254, MIMO detector 236 or 256, receive processor 238 or 258, controller/processor 240 or 280, memory 242 or 282, or the like); and/or means for applying a second configuration to the cell based at least in part on the measurement timing configuration indication (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, a neighbor information communication comprising a measurement timing configuration indication associated with a cell served by the second network node, the cell having a first cell configuration, wherein the measurement timing configuration indicates a second cell configuration (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the second cell configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for receiving, from a second network node, a neighbor information communication comprising a measurement timing configuration that includes indicates at least one of an SMTC periodicity or a link type (e.g., using antenna 234 or 252, modem 232 or 254, MIMO detector 236 or 256, receive processor 238 or 258, controller/processor 240 or 280, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, a neighbor information communication comprising a measurement timing configuration that includes indicates at least one of an SMTC periodicity or a link type (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for receiving, from a second network node, cell direction information associated with a cell served by the first network node (e.g., using antenna 234 or 252, modem 232 or 254, MIMO detector 236 or 256, receive processor 238 or 258, controller/processor 240 or 280, memory 242 or 282, or the like); and/or means for performing a communication task based at least in part on the cell direction information (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, cell direction information associated with a cell served by the second network node (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the cell direction information (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for receiving, from a second network node, cell information associated with a cell served by the second network node, the cell information indicating mobile status information corresponding to the cell (e.g., using antenna 234 or 252, modem 232 or 254, MIMO detector 236 or 256, receive processor 238 or 258, controller/processor 240 or 280, memory 242 or 282, or the like); and/or means for performing a communication task based at least in part on the mobile status information (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, cell information associated with a cell served by the first network node, the cell information indicating mobile status information corresponding to the cell (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the mobile status information (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for receiving, from a second network node, a neighbor information communication comprising a measurement timing configuration that includes indicates at least one of an SMTC parameter or an STC parameter (e.g., using antenna 234 or 252, modem 232 or 254, MIMO detector 236 or 256, receive processor 238 or 258, controller/processor 240 or 280, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, a neighbor information communication comprising a measurement timing configuration that includes indicates at least one of an SMTC parameter or an STC parameter (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for receiving, from a second network node, an over-the-air communication comprising a measurement timing configuration associated with at least one of a cell or the second network node, the measurement timing configuration indicating at least one of an SMTC parameter or an STC parameter (e.g., using antenna 234 or 252, modem 232 or 254, MIMO detector 236 or 256, receive processor 238 or 258, controller/processor 240 or 280, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, an over-the-air communication comprising a measurement timing configuration associated with at least one of a cell or the first network node, the measurement timing configuration indicating at least one of an SMTC parameter or an STC parameter (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for receiving, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell (e.g., using antenna 234 or 252, modem 232 or 254, MIMO detector 236 or 256, receive processor 238 or 258, controller/processor 240 or 280, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like).

In some aspects, the first network node includes means for transmitting, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell (e.g., using controller/processor 240 or 280, transmit processor 220 or 264, TX MIMO processor 230 or 266, modem 232 or 254, antenna 234 or 252, memory 242 or 282, or the like); and/or means for performing a communication task based at least in part on the measurement timing configuration (e.g., using antenna 234 or 252, transmit processor 220 or 264, TX MIMO processor 230 or 266, modem 232 or 254, MIMO detector 236 or 256, receive processor 238 or 258, controller/processor 240 or 280, memory 242 or 282, or the like). In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
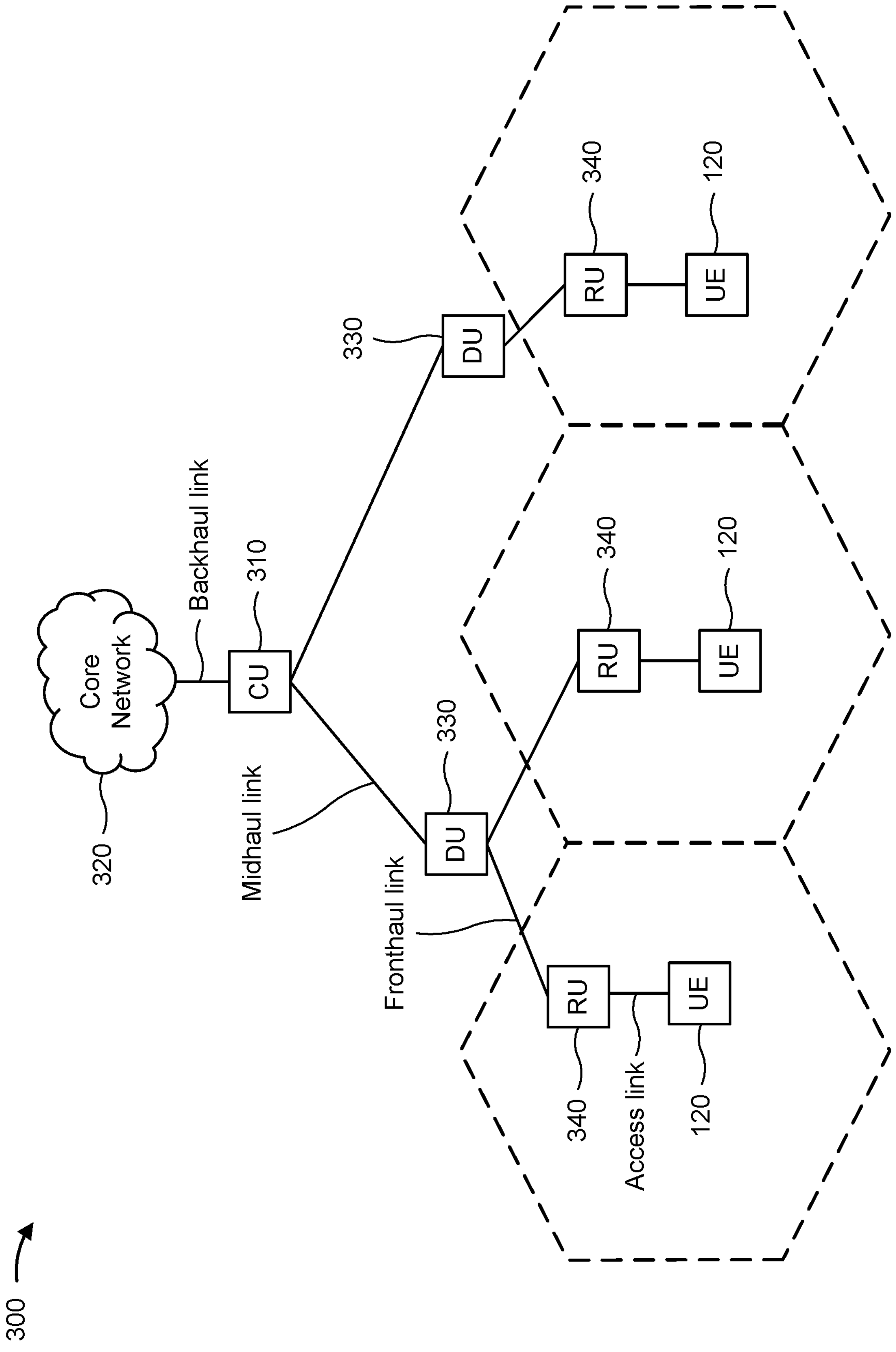
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via RF access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over-the-air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
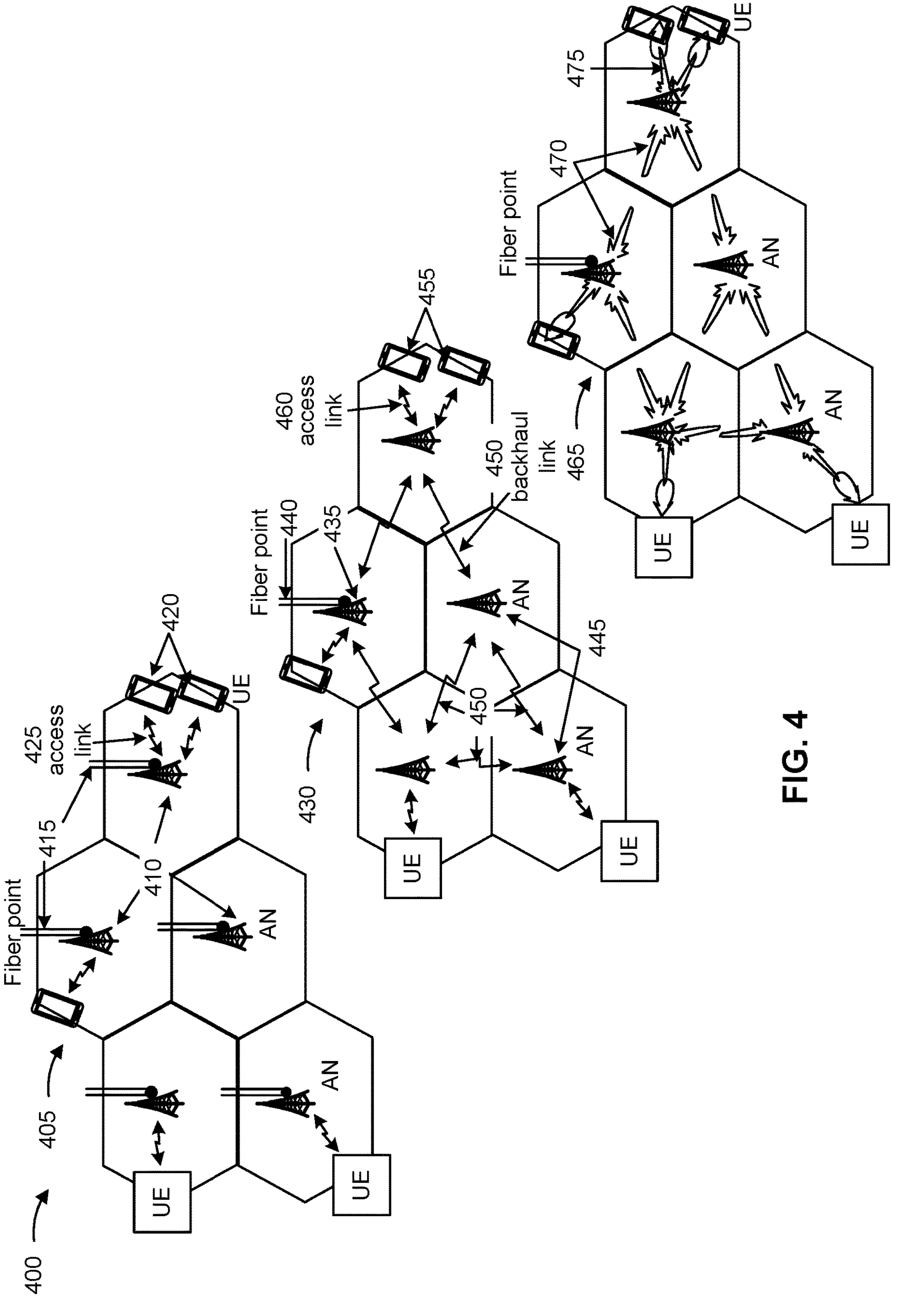
FIG. 4 is a diagram illustrating examples of radio access networks, in accordance with the present disclosure.

FIG. 4 is a diagram illustrating examples 400 of radio access networks, in accordance with the present disclosure.

As shown by reference number 405, a traditional (e.g., 3G, 4G, or LTE) radio access network may include multiple base stations 410 (e.g., access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may be a base station 110 shown in FIG. 1. In some aspects, a UE 420 shown in FIG. 4 may be a UE 120 shown in FIG. 1.

As shown by reference number 430, a radio access network may include a wireless backhaul network, sometimes referred to as an IAB network. In an IAB network, at least one base station is an anchor base station 435 that communicates with a core network via a wired backhaul link 440, such as a fiber connection. An anchor base station 435 may also be referred to as an IAB donor (or IAB-donor). The IAB network may include one or more non-anchor base stations 445, sometimes referred to as relay base stations or IAB nodes (or IAB-nodes). The non-anchor base station 445 may communicate directly or indirectly with the anchor base station 435 via one or more backhaul links 450 (e.g., via one or more non-anchor base stations 445) to form a backhaul path to the core network for carrying backhaul traffic. Backhaul link 450 may be a wireless link. Anchor base station(s) 435 and/or non-anchor base station(s) 445 may communicate with one or more UEs 455 via access links 460, which may be wireless links for carrying access traffic. In some aspects, an anchor base station 435 and/or a non-anchor base station 445 shown in FIG. 4 may be a base station 110 shown in FIG. 1. In some aspects, a UE 455 shown in FIG. 4 may be a UE 120 shown in FIG. 1.

As shown by reference number 465, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 470 between base stations may use millimeter wave signals to carry information and/or may be directed toward a target base station using beamforming. Similarly, the wireless access links 475 between a UE and a base station may use millimeter wave signals and/or may be directed toward a target wireless node (e.g., a UE and/or a base station). In this way, inter-link interference may be reduced.

The configuration of base stations and UEs in FIG. 4 is shown as an example, and other examples are contemplated. For example, one or more base stations illustrated in FIG. 4 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 4 is provided as an example. Other examples may differ from what is described with regard to FIG. 4.

Figure 5:
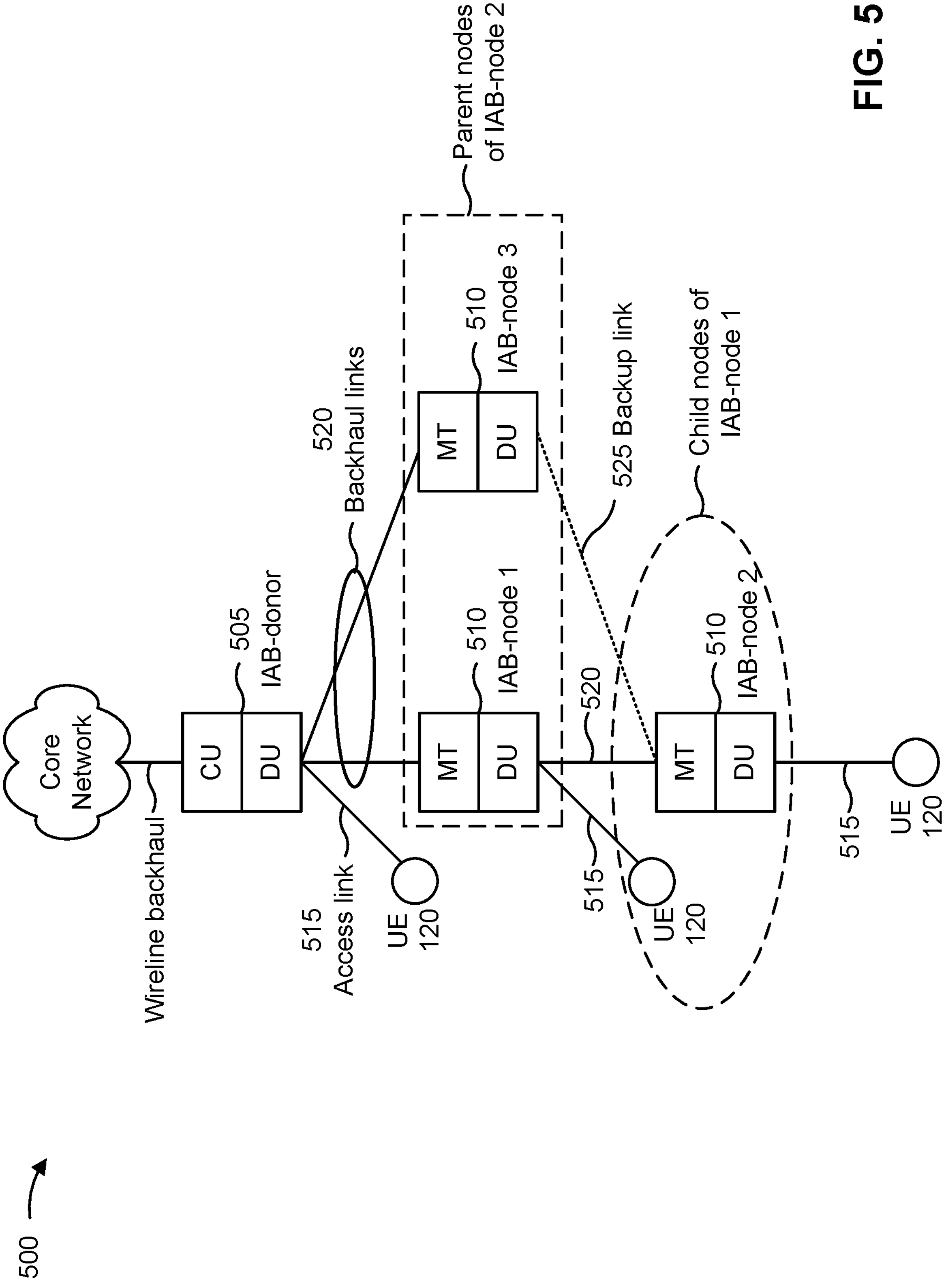
FIG. 5 is a diagram illustrating an example of an integrated access and backhaul (IAB) network architecture, in accordance with the present disclosure

FIG. 5 is a diagram illustrating an example 500 of an IAB network architecture, in accordance with the present disclosure.

As shown in FIG. 5, an IAB network may include an IAB donor 505 (shown as IAB-donor) that connects to a core network via a wired connection (shown as a wireline backhaul). For example, an Ng interface of an IAB donor 505 may terminate at a core network. Additionally, or alternatively, an IAB donor 505 may connect to one or more devices of the core network that provide a core access and mobility management function (e.g., AMF). In some aspects, an IAB donor 505 may include a base station 110, such as an anchor base station, as described above in connection with 4. As shown, an IAB donor 505 may include a CU, which may perform access node controller (ANC) functions and/or AMF functions. The CU may configure a DU of the IAB donor 505 and/or may configure one or more IAB nodes 510 (e.g., a mobile termination (MT) and/or a DU of an IAB node 510) that connect to the core network via the IAB donor 505. Thus, a CU of an IAB donor 505 may control and/or configure the entire IAB network that connects to the core network via the IAB donor 505, such as by using control messages and/or configuration messages (e.g., an RRC configuration message or an F1 application protocol (F1-AP) message).

As further shown in FIG. 5, the IAB network may include IAB nodes 510 (shown as IAB-node 1, IAB-node 2, and IAB-node 3) that connect to the core network via the IAB donor 505. As shown, an IAB node 510 may include MT functions (also sometimes referred to as UE functions (UEF)) and may include DU functions (also sometimes referred to as access node functions (ANF)). The MT functions of an IAB node 510 (e.g., a child node) may be controlled and/or scheduled by another IAB node 510 (e.g., a parent node of the child node) and/or by an IAB donor 505. The DU functions of an IAB node 510 (e.g., a parent node) may control and/or schedule other IAB nodes 510 (e.g., child nodes of the parent node) and/or UEs 120. Thus, a DU may be referred to as a scheduling node or a scheduling component, and an MT may be referred to as a scheduled node or a scheduled component. In some aspects, an IAB donor 505 may include DU functions and not MT functions. That is, an IAB donor 505 may configure, control, and/or schedule communications of IAB nodes 510 and/or UEs 120. A UE 120 may include only MT functions, and not DU functions. That is, communications of a UE 120 may be controlled and/or scheduled by an IAB donor 505 and/or an IAB node 510 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 505 or an IAB node 510, and a child node may be an IAB node 510 or a UE 120. Communications of an MT function of a child node may be controlled and/or scheduled by a parent node of the child node.

As further shown in FIG. 5, a link between a UE 120 (e.g., which only has MT functions, and not DU functions) and an IAB donor 505, or between a UE 120 and an IAB node 510, may be referred to as an access link 515. Access link 515 may be a wireless access link that provides a UE 120 with radio access to a core network via an IAB donor 505, and optionally via one or more IAB nodes 510. Thus, the network illustrated in 5 may be referred to as a multi-hop network or a wireless multi-hop network.

As further shown in FIG. 5, a link between an IAB donor 505 and an IAB node 510 or between two IAB nodes 510 may be referred to as a backhaul link 520. Backhaul link 520 may be a wireless backhaul link that provides an IAB node 510 with radio access to a core network via an IAB donor 505, and optionally via one or more other IAB nodes 510. In an IAB network, network resources for wireless communications (e.g., time resources, frequency resources, and/or spatial resources) may be shared between access links 515 and backhaul links 520. In some aspects, a backhaul link 520 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 525 between IAB-node 2 and IAB-node 3 may be used for backhaul communications if a primary backhaul link between IAB-node 2 and IAB-node 1 fails. As used herein, a node or a wireless node may refer to an IAB donor 505 or an IAB node 510.

As indicated above, FIG. 5 is provided as an example. Other examples may differ from what is described with regard to FIG. 5.

Wireless communication standards specifying NR technologies support exchange of measurement timing configuration messages (e.g., MeasurementTimingConfiguration messages) between network nodes to facilitate exchange of assistance information that may be used for measurement timing procedures. The measurement timing configuration messages may be exchanged, for example, between base stations, CUs, and/or DUs, among other examples. In some cases, the measurement timing configuration messages may be transmitted over an F1 interface or an Xn interface.

For example, over the F1, interface, a measurement timing configuration may be transmitted from a DU to a CU as part of the DU's served cell information, or from a CU to a DU as part of UE context setup and/or update information (e.g., for use by the DU to provide measurement gaps for a UE). Over the Xn interface, measurement timing information may be transmitted from a first CU to a second CU as part of served cell information and/or neighbor information. Neighbor information may include information about the first CU's served cells and neighbor cells with respect to the first CU. The neighbor cells may be associated with the first CU, the second CU, or a third CU. However, the measurement timing configuration information may include inefficiencies and/or other opportunities for enhancement that may facilitate more efficient and productive communications between network nodes, as described below in connection with FIG. 6.

For example, in some wireless communication standards, measurement timing configuration can be a mandatory field of neighbor information communications on an Xn interface. However, in some cases, a first CU can share, with a second CU, neighbor information that includes neighbor information associated with cells that are served by the second CU. That neighbor information can be already known by the second CU.

In some cases, IAB configurations can support SMTCs with larger periodicities for IAB-MTs than for UEs.

In some cases, over an F1 interface, a DU can indicate to a CU, as part of served cell information, the cell direction for the cells served by the DU. The cell direction refers to the communication direction (e.g., uplink, downlink, or bi-directional) associated with the cells. Cell direction information is typically not shared over an Xn interface (e.g., among CUs) or provided to a DU by a CU (e.g., when DU is provided with neighbor cell info). However, cell direction information may be useful for interference management. For example, an uplink-only cell can only be a victim, while a downlink-only cell can only be an aggressor. If some cells can only be a victim, another cell may not be concerned and may not obtain interference measurements associated with those cells. In some examples, for interference mitigation, a cell may adjust its configuration (e.g., time resources, frequency resources, beamforming configurations, power, and/or timing alignment, among other examples), and the knowledge about which cells could be only aggressor or only victim may enable the cell to determine a more efficient configuration In some cases, IAB nodes, cells, base stations, and/or TRPs (among other examples) may be mobile. Information about which neighboring IAB nodes, cells, base stations, and/or TRPs are mobile may be useful for interference management, updating neighbor relation info, and/or UEs mobility, among other examples. In some cases, the topology and neighbor relations can be dynamically changing, which can cause dynamically changing interference. Effective management of the dynamically changing interference may be facilitated by mobile status information associated with nearby network nodes. Mobile status information may include an indication of whether a network node and/or cell is mobile, a direction of travel of the network node and/or a speed of the network node and/or cell, among other examples. For example, in some cases, a network node may utilize a mode-specific configuration (e.g., a configuration corresponding to a mobile status and/or a configuration corresponding to a stationary status), thereby simplifying configuration adaptation as the network node and/or cell moves.

In some cases, a DU (based on its implementation) may discover neighboring cells and acquire further information from them (e.g., frequency information, cell direction, measurement configuration, SSB configuration, and/or random access channel (RACH) information, among other examples). For example, in some cases, the DU may be an IAB DU and a co-located MT can acquire information about neighbor cells. Typically, F1 signaling does not include a mechanism for the DU to inform a CU about the neighbor cells.

To support mutual detectability (e.g., in situations involving half-duplex constraints), a network node can measure signals from neighboring network nodes in a first subset of communication occasions and send its own signals in another subset of occasions. Typically, the behavior described above can be achieved by configuration. For example, a CU can configure non-overlapping SMTC and STC windows for an IAB-MT and its collocated IAB-DU cells. In some cases, the CU can provide assistance information about measurement timing configurations, via an Xn interface, that can allow a CU to configure SMTC for UEs and/or MTs served by the CU. However, configuring communication occasions in this manner can lead to additional overhead.

Some aspects of the techniques and apparatuses described herein may provide for enhanced signaling between network nodes that may take advantage of measurement timing configuration information signaling to provide additional information or, in some cases, to make otherwise mandatory information optional. In this way, some aspects may facilitate more efficient and useful communications between network nodes, thereby resulting in improved measurement timing configurations and/or resource allocations, among other examples. As a result, some aspects may have a positive impact on network performance.

Figure 6:
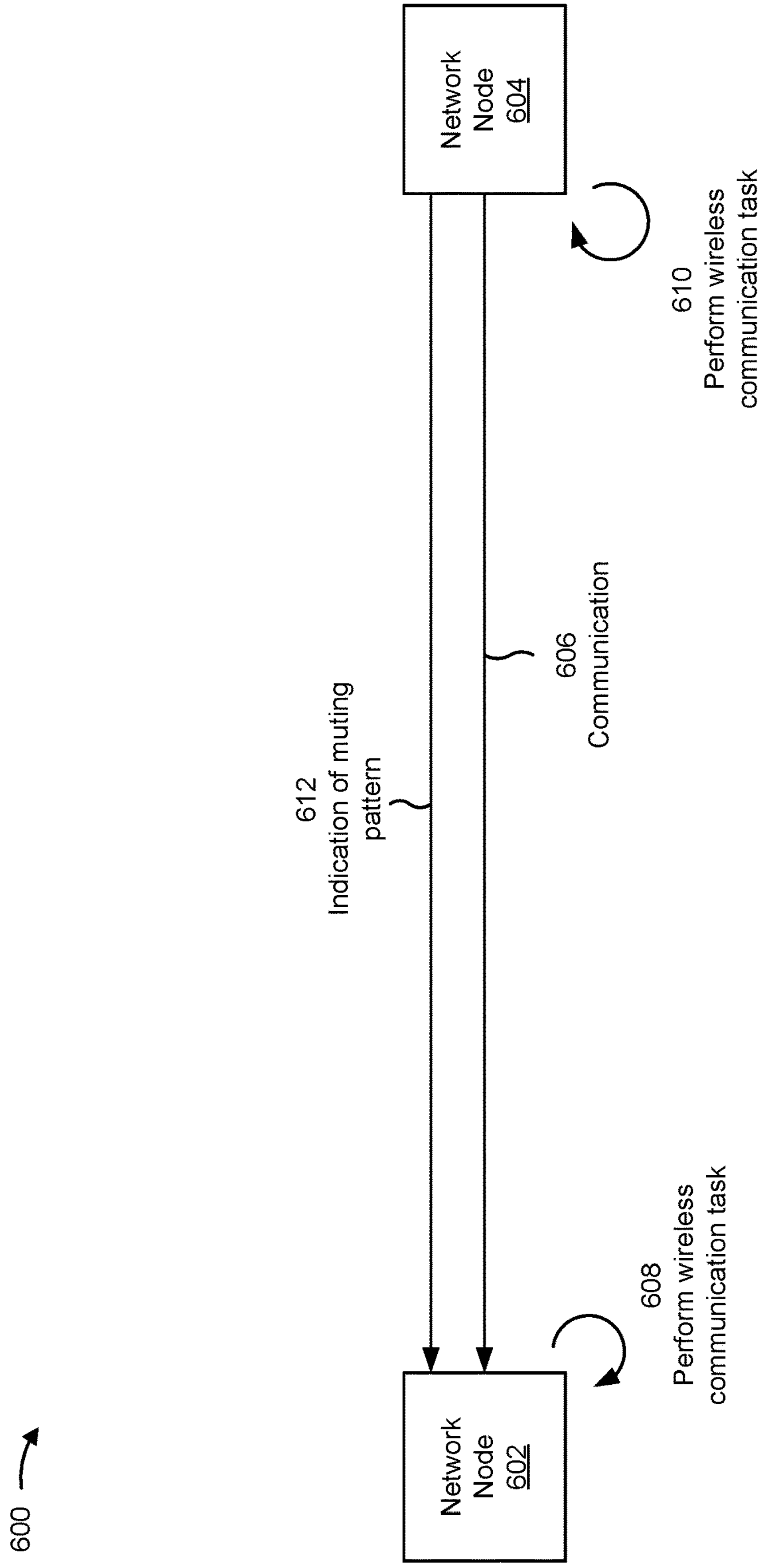
FIG. 6 is a diagram illustrating an example associated with measurement timing configuration indications between network nodes, in accordance with the present disclosure.

FIG. 6 is a diagram illustrating an example 600 of measurement timing configuration indications between network nodes, in accordance with the present disclosure. As shown in FIG. 6, a network node 602 and a network node 604 may communicate with one another. In some aspects, the network node 602 and/or the network node 604 may include a base station, an IAB node, a CU, a DU, an MT, and/or a UE, among other examples.

As shown by reference number 606, the network node 602 may transmit, and the network node 604 may receive, a communication. The communication may include any number of different types of communications transmitted, for example, over an F1 interface, an Xn interface, and/or an OTA interface, among other examples, based on the context. As shown by reference number 608, the network node 602 may perform a communication task based at least in part on the communication. Similarly, as shown by reference number 610, the network node 604 may perform a communication task based at least in part on the communication. As described below, the communication and/or the additional communication may include information that may be used to facilitate any number of measurement timing configuration operations and/or other cell management operations.

For example, in some wireless communication standards, measurement timing configuration can be a mandatory field of neighbor information communications on an Xn interface. However, in some cases, a first CU can share, with a second CU, neighbor information that includes neighbor information associated with cells that are served by the second CU. That neighbor information can be already known by the second CU. In some aspects, the neighbor information associated with such cells may be optional, thereby reducing the transmission of redundant information.

For example, in some aspects, the communication may include a neighbor information communication that includes a measurement timing configuration indication associated with a cell served by the network node 602. In some aspects, indication of measurement timing configuration for a neighbor cell that is a served cell of the network node receiving the indication may be interpreted as a preferred configuration and/or a requested configuration for that cell. The cell may have a first cell configuration. The network node 602 may perform the wireless communication task, for example, by applying a second configuration to the cell based at least in part on the measurement timing configuration indication.

For example, in some aspects, the measurement timing configuration indication may indicate the second configuration. The measurement timing configuration indication may include a request associated with the second configuration. The request may include an implicit request based at least in part on the cell being a neighbor cell with respect to the network node 604. In some aspects, the measurement timing configuration indication may include an explicit indication of the request. For example, the explicit indication of the request may include a dedicated indication flag.

In some cases, IAB configurations can support SMTCs with larger periodicities for IAB-MTs than for UEs. For example, in some cases, the maximum SMTC periodicity for UEs can be 160 milliseconds (ms), while the maximum SMTC periodicity for IAB-MTs can be 1280 ms. In some aspects, measurement timing configuration may indicate SMTC periodicities that are greater than the maximum SMTC periodicity for UEs. For example, in some aspects, the communication may include a neighbor information communication. The neighbor information communication may include a measurement timing configuration that indicates at least one of an SMTC periodicity or a link type. For example, the SMTC configuration may indicate an SMTC periodicity corresponding to an IAB-MT. In some aspects, the SMTC periodicity may be greater than a UE SMTC periodicity. The link type may include a backhaul link type or an access link type. In some aspects, the measurement timing configuration may include a dedicated indication flag corresponding to the link type.

For example, in some aspects, the communication may include cell direction information associated with a cell served by the network node 602, and the network node 602 may perform the communication task based at least in part on the cell direction information. In some aspects, the network node 602 may include a first central unit, and the network node 604 may include a second central unit. In some aspects, the cell direction information (e.g., via the communication) may be transmitted via an Xn interface. In some aspects, the cell direction information may be indicated in a served cell information field. In some aspects, the cell direction information may be indicated in a neighbor information field.

In some aspects, the cell direction information may be transmitted via an F1 interface. For example, the network node 602 may include a CU, and the network node 604 may include a DU. The cell direction information may be indicated in a neighbor cell information list. In some aspects, the cell direction information may correspond to at least one of a TRP or a beam. The cell direction information may indicate only one direction corresponding to the at least one of the TRP or the beam. In some aspects, for example, the cell direction information indicates only one direction corresponding to a resource associated with the at least one of the TRP or the beam. In some aspects, the cell direction information may indicate direction information associated with at least one of an SSB or an SSB area.

In some aspects, the cell direction information may include a measurement timing indicator corresponding to at least one of an SSB index, an STC parameter, or an SMTC parameter. The SMTC parameter may indicate an STC window and/or the SMTC parameter may indicate an SMTC window. In some aspects, for example, the SMTC window may be associated only with one cell direction. In some aspects, the cell direction information may indicate direction information associated with at least a specified portion of a bandwidth. For example, the cell direction information may correspond to a specified set resources blocks.

In some aspects, for example, the communication may include cell information associated with a cell served by the network node 604. The cell information may indicate mobile status information corresponding to the cell. In some aspects, for example, the mobile status information may indicate that the cell is mobile, while in some other aspects, the mobile status information may indicate that the cell is stationary. In some aspects, the cell information may include served cell information, the network node 602 may be a CU, and the network node 604 may be a DU. In some aspects, the cell information may include a neighbor cell information list, the network node 602 may be a DU, and the network node 604 may be a CU. In some aspects, the cell information may be transmitted via an F1 interface. In some aspects, the cell information may include at least one of served cell information or neighbor information.

In some aspects, the cell information may be transmitted via an Xn interface. In some aspects, the cell information may correspond to at least one of an SSB or a TRP. In some aspects, the cell may be associated with a fixed configuration. For example, the fixed configuration may correspond to at least one of an SMTC window or a reception configuration window. The cell information may indicate the fixed configuration. In some aspects, the network node 602 may receive the cell information prior to the cell having a location proximate the first network node. In some aspects, the cell may be associated with a mobile termination function. In some aspects, the mobile status information may include an indication corresponding to a mobile backhaul configuration. In some aspects, the mobile status information may include at least one of a measurement timing parameter or an SMTC. In some aspects, the mobile status information may correspond to a common mobile configuration associated with the cell and at least one additional cell.

In some aspects, the communication may include a neighbor information communication that includes a measurement timing configuration that indicates at least one of an SMTC parameter or an STC parameter. For example, the network node 602 may perform the communication task based on negotiating one or more timing configurations between the network node 602 and at least one of the network node 604 or an additional network node. The neighbor information communication may include the STC parameter, and the STC parameter may indicate a timing configuration corresponding to a neighbor cell with respect to the second network node.

In some aspects, the measurement timing configuration indication may indicate the timing configuration. In some aspects, the measurement timing configuration indication may include a request associated with the timing configuration. In some aspects, the request may include an implicit request based at least in part on the neighbor cell being a neighbor cell with respect to the network node 604. In some aspects, the measurement timing configuration may include an explicit indication of the request. For example, the explicit indication of the request may include a dedicated indication flag.

In some aspects, the communication may include an OTA communication having a measurement timing configuration associated with at least one of a cell or the network node 604. The measurement timing configuration may indicate at least one of an SMTC parameter or an STC parameter. In some aspects, the network node 604 may include at least one of a DU or an MT function. In some aspects, the OTA communication may include a broadcast signal. In some aspects, the cell may include a neighbor cell with respect to the network node 604. The network node 602 may include a DU, and the network node 604 may include a CU. In some aspects, the network node 604 may include a DU, and the network node 602 may include a CU.

In some aspects, the communication may include a measurement timing configuration associated with a cell. The measurement timing configuration may indicate at least one of an SMTC parameter or an STC parameter. The at least one of the SMTC parameter or the STC parameter may indicate one or more candidate resources corresponding to an SSB associated with the cell. In some aspects, the one or more candidate resources may include at least one of an uplink resource or a downlink resource. In some aspects, as shown by reference number 612, the network node 604 may transmit, and the network node 602 may receive, an indication of a muting pattern associated with the SSB. In some aspects, for example, the indication of the muting pattern may include at least one of a bitmap, a scaling factor, or an offset. In some aspects, the measurement timing configuration may include the muting pattern. In some aspects, the measurement timing configuration may be transmitted via a first communication interface, and the indication of the muting pattern may be transmitted via a second communication interface that is different from the first communication interface. In some aspects, for example, the second communication interface may include an OTA communication interface.

As indicated above, FIG. 6 is provided as an example. Other examples may differ from what is described with respect to FIG. 6.

Figure 7:
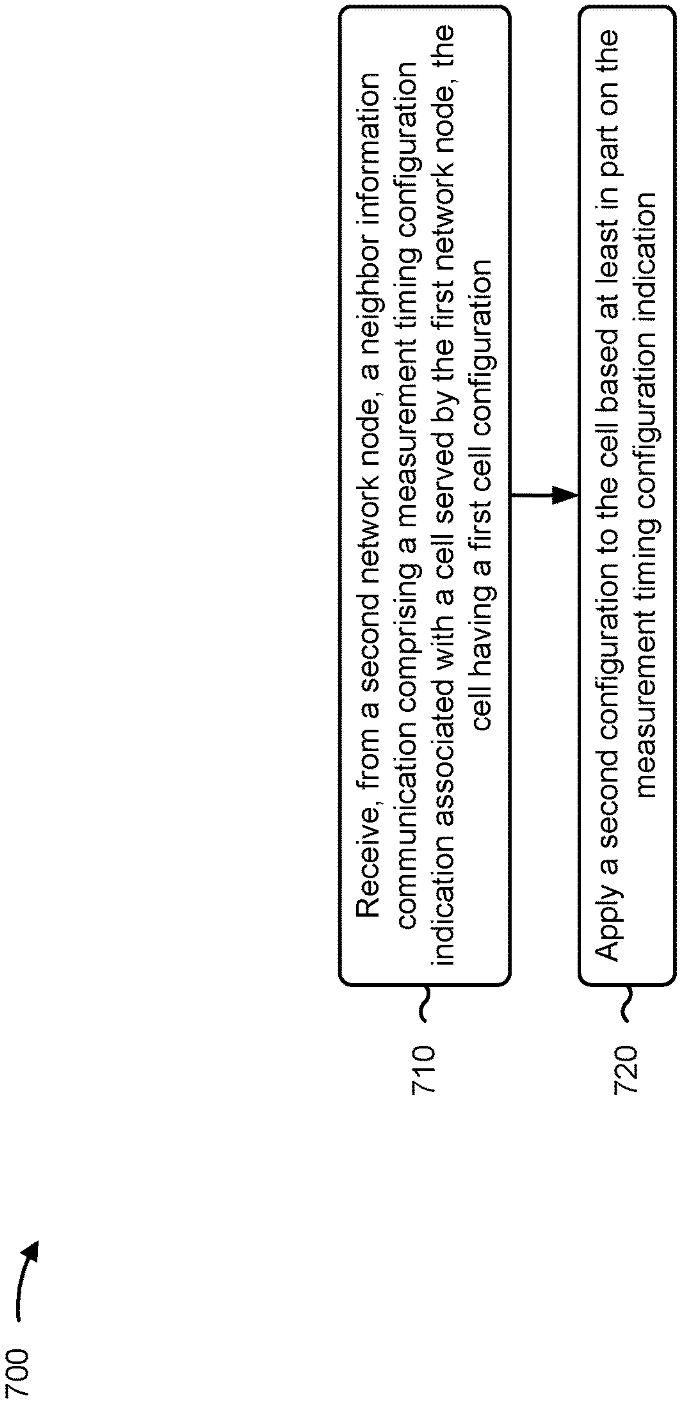
FIGS. 7-20 are diagrams illustrating example processes associated with measurement timing configuration indications between network nodes, in accordance with the present disclosure.

FIG. 7 is a diagram illustrating an example process 700 performed, for example, by a first network node, in accordance with the present disclosure. Example process 700 is an example where a first network node (e.g., network node 602) performs operations associated with measurement timing configuration indications between network nodes.

As shown in FIG. 7, in some aspects, process 700 may include receiving, from a second network node, a neighbor information communication comprising a measurement timing configuration indication associated with a cell served by the first network node, the cell having a first cell configuration (block 710). For example, the first network node (e.g., using communication manager 2108 and/or reception component 2102, depicted in FIG. 21) may receive, from a second network node, a neighbor information communication comprising a measurement timing configuration indication associated with a cell served by the first network node, the cell having a first cell configuration, as described above, for example, with reference to FIG. 6.

As further shown in FIG. 7, in some aspects, process 700 may include applying a second configuration to the cell based at least in part on the measurement timing configuration indication (block 720). For example, the first network node (e.g., using communication manager 2108, reception component 2102, and/or transmission component 2104, depicted in FIG. 21) may apply a second configuration to the cell based at least in part on the measurement timing configuration indication, as described above, for example, with reference to FIG. 6.

Process 700 may include additional aspects, such as any single aspect or any combination of aspects described below and/or in connection with one or more other processes described elsewhere herein.

In a first aspect, the measurement timing configuration indication indicates the second configuration. In a second aspect, alone or in combination with the first aspect, the measurement timing configuration indication comprises a request associated with the second configuration. In a third aspect, alone or in combination with the second aspect, the request comprises an implicit request based at least in part on the cell comprising a neighbor cell with respect to the second network node. In a fourth aspect, alone or in combination with the second aspect, the measurement timing configuration indication includes an explicit indication of the request. In a fifth aspect, alone or in combination with the fourth aspect, the explicit indication of the request comprises a dedicated indication flag.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
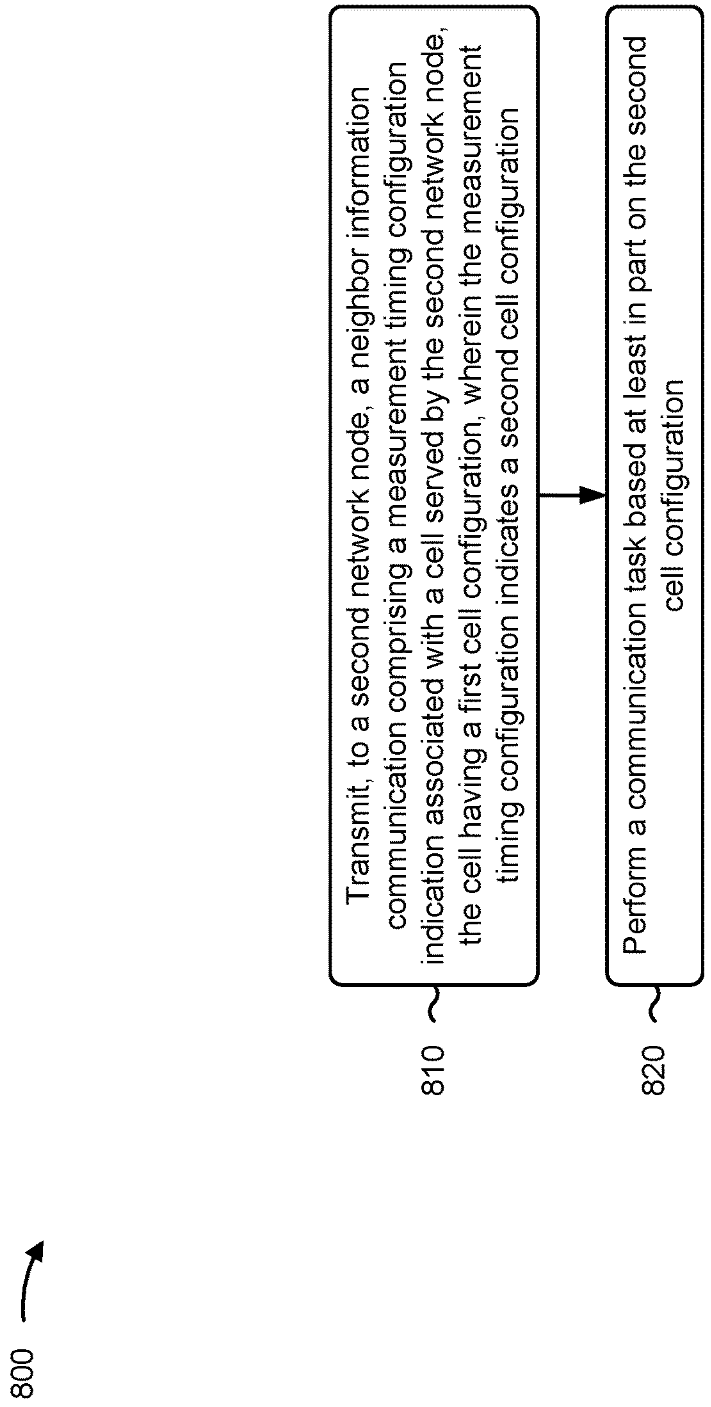

FIG. 8 is a diagram illustrating an example process 800 performed, for example, by a first network node, in accordance with the present disclosure. Example process 800 is an example where a first network node (e.g., network node 604) performs operations associated with measurement timing configuration indications between network nodes.

As shown in FIG. 8, in some aspects, process 800 may include transmitting, to a second network node, a neighbor information communication comprising a measurement timing configuration indication associated with a cell served by the second network node, the cell having a first cell configuration, wherein the measurement timing configuration indicates a second cell configuration (block 810). For example, the first network node (e.g., using communication manager 2108 and/or transmission component 2104, depicted in FIG. 21) may transmit, to a second network node, a neighbor information communication comprising a measurement timing configuration indication associated with a cell served by the second network node, the cell having a first cell configuration, wherein the measurement timing configuration indicates a second cell configuration, as described above, for example, with reference to FIG. 6.

As further shown in FIG. 8, in some aspects, process 800 may include performing a communication task based at least in part on the second cell configuration (block 820). For example, the first network node (e.g., using communication manager 2108, reception component 2102, and/or transmission component 2104, depicted in FIG. 21) may perform a communication task based at least in part on the second cell configuration, as described above, for example, with reference to FIG. 6.

Process 800 may include additional aspects, such as any single aspect or any combination of aspects described below and/or in connection with one or more other processes described elsewhere herein.

In a first aspect, the measurement timing configuration indication indicates the second configuration. In a second aspect, alone or in combination with the first aspect, the measurement timing configuration indication comprises a request associated with the second configuration. In a third aspect, alone or in combination with the second aspect, the request comprises an implicit request based at least in part on the cell comprising a neighbor cell with respect to the second network node. In a fourth aspect, alone or in combination with the second aspect, the measurement timing configuration indication includes an explicit indication of the request. In a fifth aspect, alone or in combination with the fourth aspect, the explicit indication of the request comprises a dedicated indication flag.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
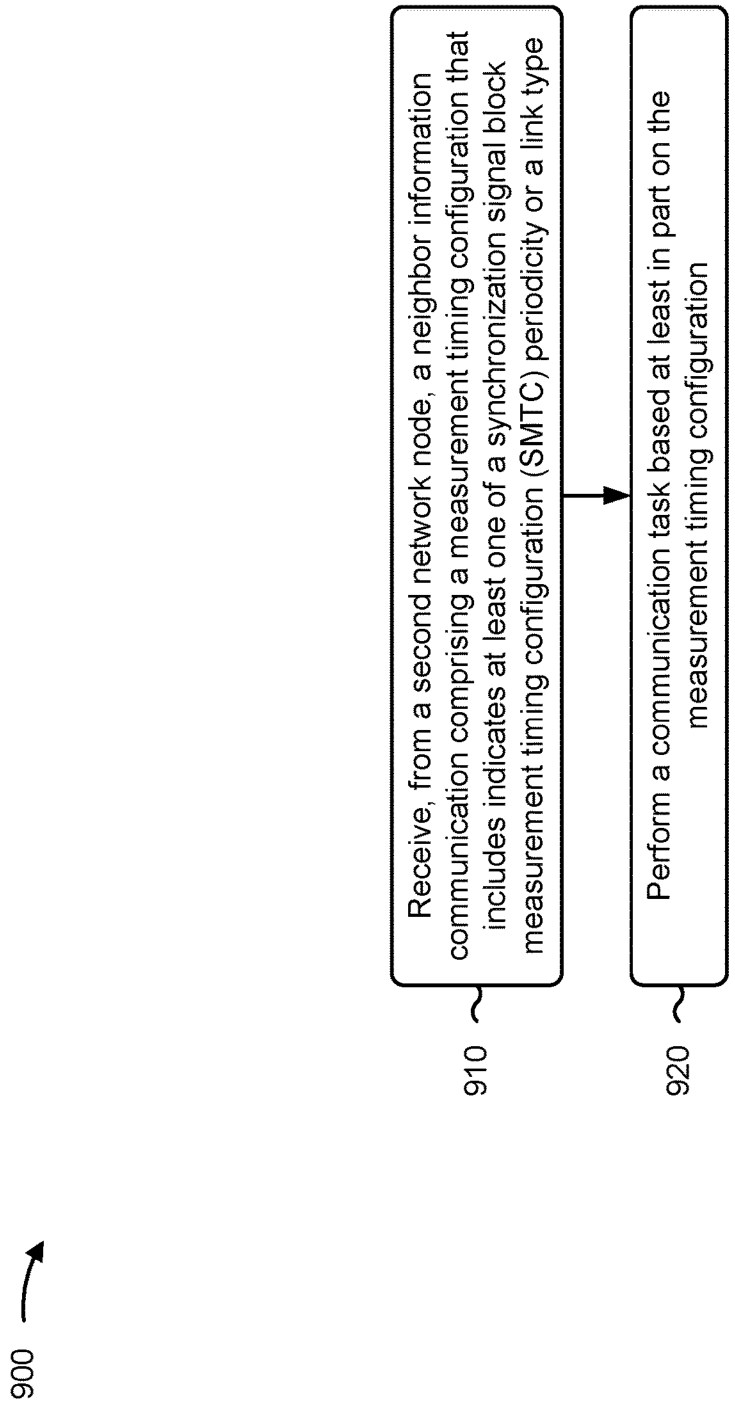

FIG. 9 is a diagram illustrating an example process 900 performed, for example, by a first network node, in accordance with the present disclosure. Example process 900 is an example where a first network node (e.g., network node 602) performs operations associated with measurement timing configuration indications between network nodes.

As shown in FIG. 9, in some aspects, process 900 may include receiving, from a second network node, a neighbor information communication comprising a measurement timing configuration that includes indicates at least one of an SMTC periodicity or a link type (block 910). For example, the first network node (e.g., using communication manager 2108 and/or reception component 2102, depicted in FIG. 21) may receive, from a second network node, a neighbor information communication comprising a measurement timing configuration that includes indicates at least one of an SMTC periodicity or a link type, as described above, for example, with reference to FIG. 6.

As further shown in FIG. 9, in some aspects, process 900 may include performing a communication task based at least in part on the measurement timing configuration (block 920). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 900 may include additional aspects, such as any single aspect or any combination of aspects described below and/or in connection with one or more other processes described elsewhere herein.

In a first aspect, the SMTC configuration indicates an SMTC periodicity corresponding to an integrated access and backhaul mobile termination function. In a second aspect, alone or in combination with the first aspect, the SMTC periodicity is greater than a user equipment SMTC periodicity. In a third aspect, alone or in combination with one or more of the first and second aspects, the link type comprises a backhaul link type or an access link type. In a fourth aspect, alone or in combination with the third aspect, the measurement timing configuration comprises a dedicated indication flag corresponding to the link type.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
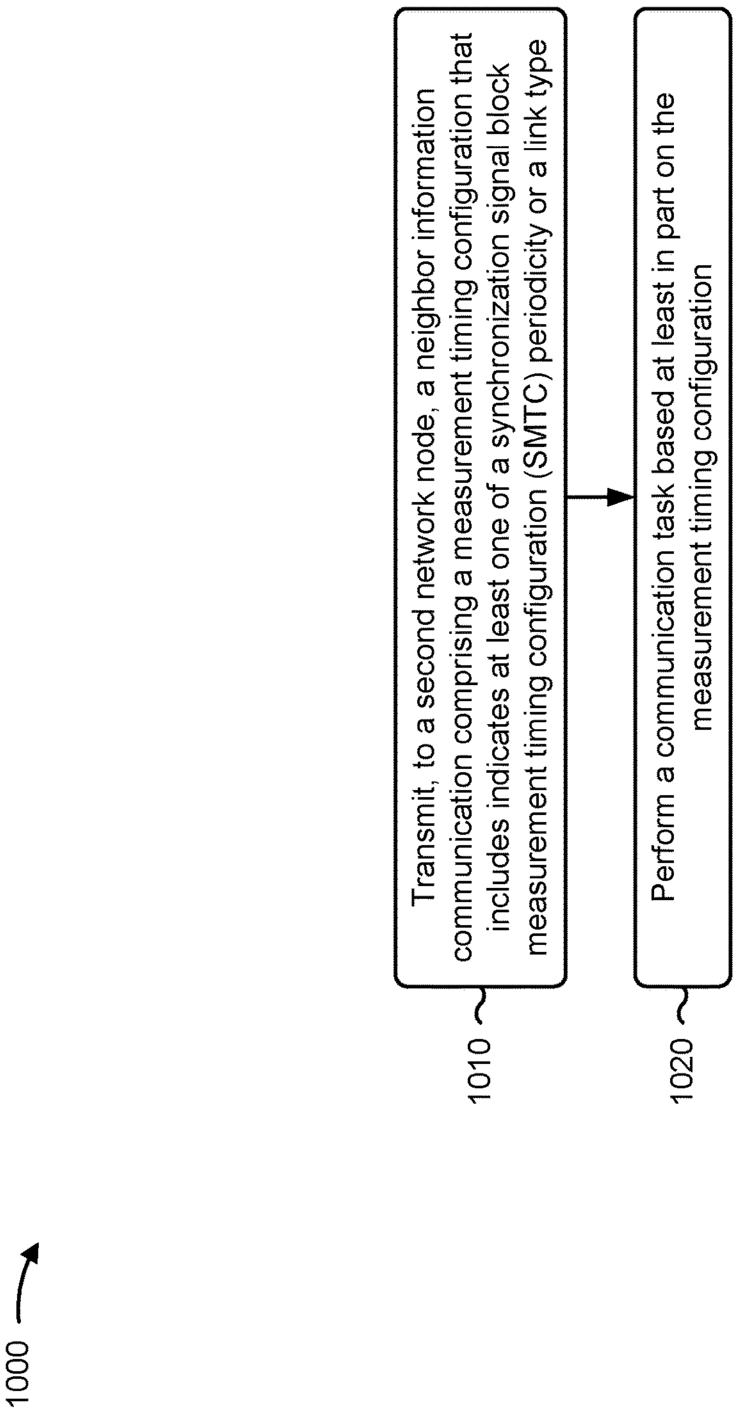

FIG. 10 is a diagram illustrating an example process 1000 performed, for example, by a first network node, in accordance with the present disclosure. Example process 1000 is an example where a first network node (e.g., network node 604) performs operations associated with measurement timing configuration indications between network nodes.

As shown in FIG. 10, in some aspects, process 1000 may include transmitting, to a second network node, a neighbor information communication comprising a measurement timing configuration that includes indicates at least one of an SMTC periodicity or a link type (block 1010). For example, the first network node (e.g., using communication manager 2108 and/or transmission component 2104, depicted in FIG. 21) may transmit, to a second network node, a neighbor information communication comprising a measurement timing configuration that includes indicates at least one of an SMTC periodicity or a link type, as described above, for example, with reference to FIG. 6.

As further shown in FIG. 10, in some aspects, process 1000 may include performing a communication task based at least in part on the measurement timing configuration (block 1020). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 1000 may include additional aspects, such as any single aspect or any combination of aspects described below and/or in connection with one or more other processes described elsewhere herein.

In a first aspect, the SMTC configuration indicates an SMTC periodicity corresponding to an integrated access and backhaul mobile termination function. In a second aspect, alone or in combination with the first aspect, the SMTC periodicity is greater than a user equipment SMTC periodicity. In a third aspect, alone or in combination with one or more of the first and second aspects, the link type comprises a backhaul link type or an access link type. In a fourth aspect, alone or in combination with the third aspect, the measurement timing configuration comprises a dedicated indication flag corresponding to the link type.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
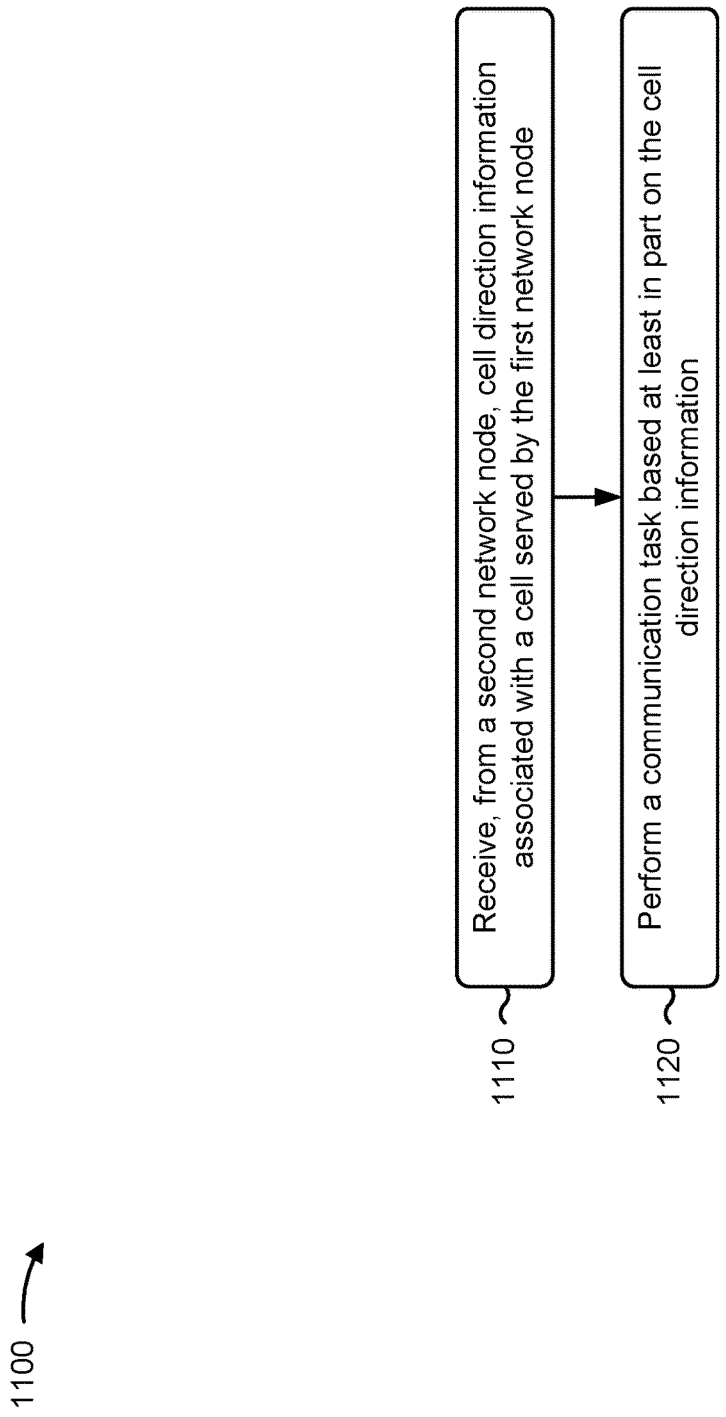

FIG. 11 is a diagram illustrating an example process 1100 performed, for example, by a first network node, in accordance with the present disclosure. Example process 1100 is an example where a first network node (e.g., network node 602) performs operations associated with measurement timing configuration indications between network nodes.

As shown in FIG. 11, in some aspects, process 1100 may include receiving, from a second network node, cell direction information associated with a cell served by the first network node (block 1110). For example, the first network node (e.g., using communication manager 2108 and/or reception component 2102, depicted in FIG. 21) may receive, from a second network node, cell direction information associated with a cell served by the first network node, as described above, for example, with reference to FIG. 6.

As further shown in FIG. 11, in some aspects, process 1100 may include performing a communication task based at least in part on the cell direction information (block 1120). For example, the first network node (e.g., using communication manager 2108, reception component 2102, and/or transmission component 2104, depicted in FIG. 21) may perform a communication task based at least in part on the cell direction information, as described above, for example, with reference to FIG. 6.

Process 1100 may include additional aspects, such as any single aspect or any combination of aspects described below and/or in connection with one or more other processes described elsewhere herein.

In a first aspect, the first network node comprises a first central unit and the second network node comprises a second central unit. In a second aspect, alone or in combination with the first aspect, receiving the cell direction information comprises receiving the cell direction information via an Xn interface. In a third aspect, alone or in combination with one or more of the first and second aspects, the cell direction information is indicated in a served cell information field. In a fourth aspect, alone or in combination with one or more of the first through third aspects, the cell direction information is indicated in a neighbor information field. In a fifth aspect, alone or in combination with one or more of the first through fourth aspects, receiving the cell direction information comprises receiving the cell direction information via an F1 interface. In a sixth aspect, alone or in combination with one or more of the first through fifth aspects, the first network node comprises a central unit and the second network node comprises a distributed unit. In a seventh aspect, alone or in combination with one or more of the first through sixth aspects, the cell direction information is indicated in a neighbor cell information list.

In an eighth aspect, alone or in combination with one or more of the first through seventh aspects, the cell direction information corresponds to at least one of a TRP or a beam. In a ninth aspect, alone or in combination with the eighth aspect, the cell direction information indicates only one direction corresponding to the at least one of the TRP or the beam. In a tenth aspect, alone or in combination with the ninth aspect, the cell direction information indicates only one direction corresponding to a resource associated with the at least one of the TRP or the beam.

In an eleventh aspect, alone or in combination with one or more of the first through tenth aspects, the cell direction information indicates direction information associated with at least one of an SSB or an SSB area. In a twelfth aspect, alone or in combination with the eleventh aspect, the cell direction information comprises a measurement timing indicator corresponding to at least one of an SSB index, an STC parameter, or an SMTC parameter. In a thirteenth aspect, alone or in combination with the twelfth aspect, the SMTC parameter indicates an STC window.

In a fourteenth aspect, alone or in combination with one or more of the twelfth or thirteenth aspects, the SMTC parameter indicates an SMTC window. In a fifteenth aspect, alone or in combination with the fourteenth aspect, the SMTC window is associated only with one cell direction. In a sixteenth aspect, alone or in combination with one or more of the first through fifteenth aspects, the cell direction information indicates direction information associated with at least a specified portion of a bandwidth. In a seventeenth aspect, alone or in combination with one or more of the first through sixteenth aspects, the cell direction information corresponds to a specified set resources blocks.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
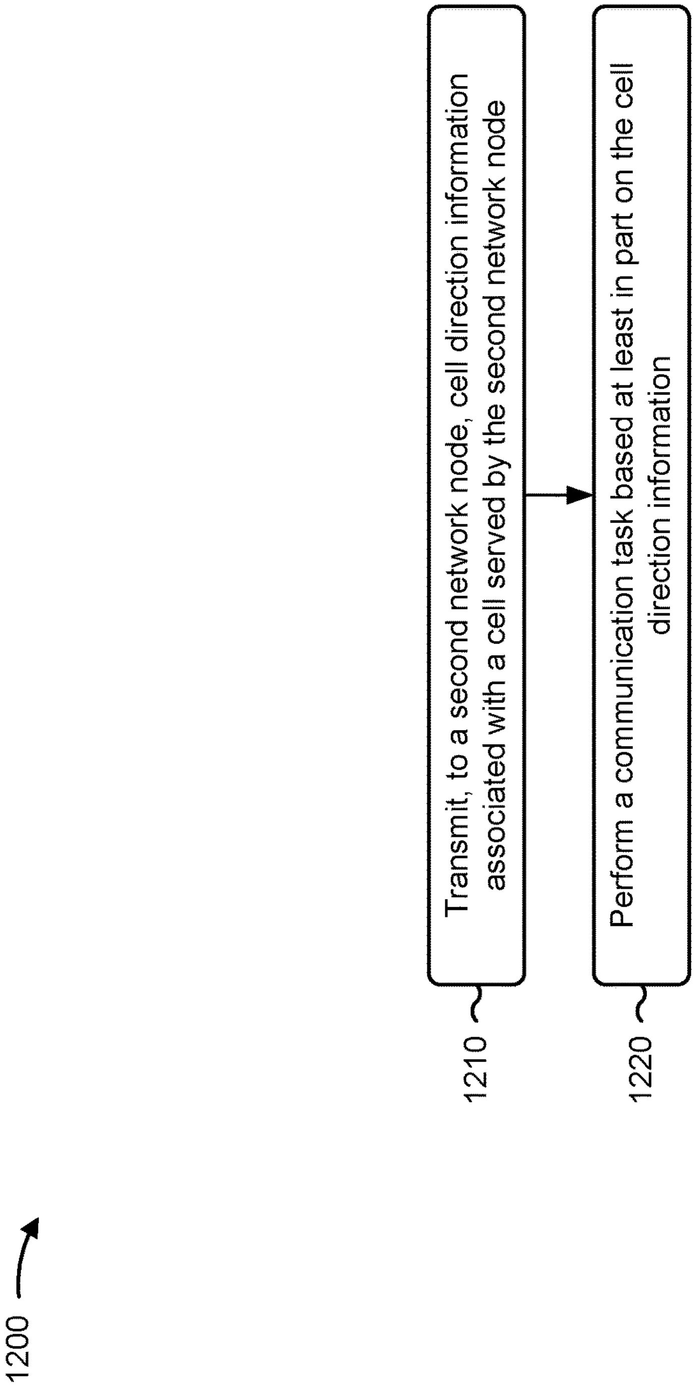

FIG. 12 is a diagram illustrating an example process 1200 performed, for example, by a first network node, in accordance with the present disclosure. Example process 1200 is an example where a first network node (e.g., network node 604) performs operations associated with measurement timing configuration indications between network nodes.

As shown in FIG. 12, in some aspects, process 1200 may include transmitting, to a second network node, cell direction information associated with a cell served by the second network node (block 1210). For example, the first network node (e.g., using communication manager 2108 and/or transmission component 2104, depicted in FIG. 21) may transmit, to a second network node, cell direction information associated with a cell served by the second network node, as described above, for example, with reference to FIG. 6.

As further shown in FIG. 12, in some aspects, process 1200 may include performing a communication task based at least in part on the cell direction information (block 1220). For example, the first network node (e.g., using communication manager 2108, reception component 2102, and/or transmission component 2104, depicted in FIG. 21) may perform a communication task based at least in part on the cell direction information, as described above, for example, with reference to FIG. 6.

Process 1200 may include additional aspects, such as any single aspect or any combination of aspects described below and/or in connection with one or more other processes described elsewhere herein.

In a first aspect, the first network node comprises a first central unit and the second network node comprises a second central unit. In a second aspect, alone or in combination with the first aspect, transmitting the cell direction information comprises transmitting the cell direction information via an Xn interface. In a third aspect, alone or in combination with one or more of the first and second aspects, the cell direction information is indicated in a served cell information field. In a fourth aspect, alone or in combination with one or more of the first through third aspects, the cell direction information is indicated in a neighbor information field. In a fifth aspect, alone or in combination with one or more of the first through fourth aspects, receiving the cell direction information comprises receiving the cell direction information via an F1 interface. In a sixth aspect, alone or in combination with one or more of the first through fifth aspects, the first network node comprises a distributed unit and the second network node comprises a central unit. In a seventh aspect, alone or in combination with one or more of the first through sixth aspects, the cell direction information is indicated in a neighbor cell information list.

In an eighth aspect, alone or in combination with one or more of the first through seventh aspects, the cell direction information corresponds to at least one of a TRP or a beam. In a ninth aspect, alone or in combination with the eighth aspect, the cell direction information indicates only one direction corresponding to the at least one of the TRP or the beam. In a tenth aspect, alone or in combination with the ninth aspect, the cell direction information indicates only one direction corresponding to a resource associated with the at least one of the TRP or the beam. In an eleventh aspect, alone or in combination with one or more of the first through tenth aspects, the cell direction information indicates direction information associated with at least one of an SSB or an SSB area. In a twelfth aspect, alone or in combination with the eleventh aspect, the cell direction information comprises a measurement timing indicator corresponding to at least one of an SSB index, an STC parameter, or an SMTC parameter. In a thirteenth aspect, alone or in combination with the twelfth aspect, the SMTC parameter indicates an STC window.

In a fourteenth aspect, alone or in combination with one or more of the twelfth or thirteenth aspects, the SMTC parameter indicates an SMTC window. In a fifteenth aspect, alone or in combination with the fourteenth aspect, the SMTC window is associated only with one cell direction. In a sixteenth aspect, alone or in combination with one or more of the first through fifteenth aspects, the cell direction information indicates direction information associated with at least a specified portion of a bandwidth. In a seventeenth aspect, alone or in combination with one or more of the first through sixteenth aspects, the cell direction information corresponds to a specified set resources blocks.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
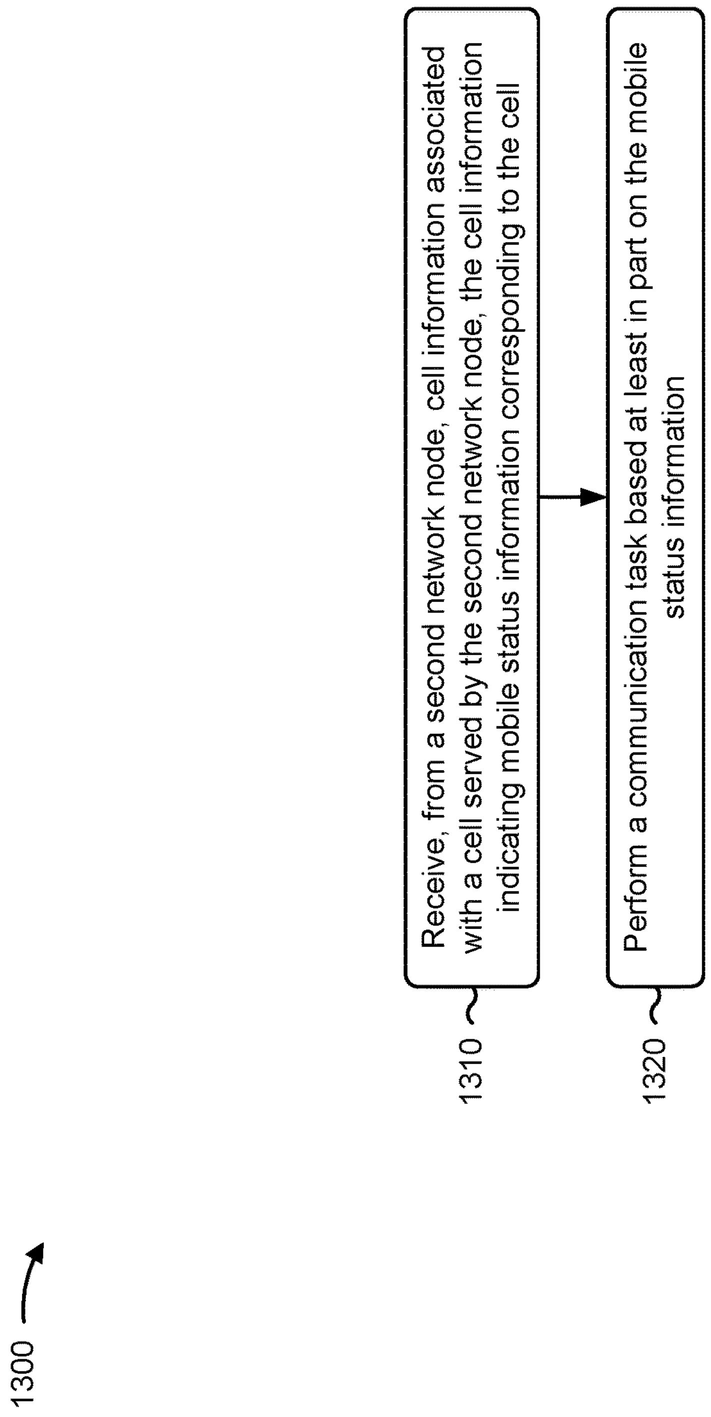

FIG. 13 is a diagram illustrating an example process 1300 performed, for example, by a first network node, in accordance with the present disclosure. Example process 1300 is an example where a first network node (e.g., network node 602) performs operations associated with measurement timing configuration indications between network nodes.

As shown in FIG. 13, in some aspects, process 1300 may include receiving, from a second network node, cell information associated with a cell served by the second network node, the cell information indicating mobile status information corresponding to the cell (block 1310). For example, the first network node (e.g., using communication manager 2108 and/or reception component 2102, depicted in FIG. 21) may receive, from a second network node, cell information associated with a cell served by the second network node, the cell information indicating mobile status information corresponding to the cell, as described above, for example, with reference to FIG. 6.

As further shown in FIG. 13, in some aspects, process 1300 may include performing a communication task based at least in part on the mobile status information (block 1320). For example, the first network node (e.g., using communication manager 2108, reception component 2102, and/or transmission component 2104, depicted in FIG. 21) may perform a communication task based at least in part on the mobile status information, as described above, for example, with reference to FIG. 6.

Process 1300 may include additional aspects, such as any single aspect or any combination of aspects described below and/or in connection with one or more other processes described elsewhere herein.

In a first aspect, the mobile status information indicates that the cell is mobile. In a second aspect, alone or in combination with the first aspect, the mobile status information indicates that the cell is stationary. In a third aspect, alone or in combination with one or more of the first and second aspects, the cell information comprises served cell information, and wherein the first network node is a central unit and the second network node is a distributed unit. In a fourth aspect, alone or in combination with one or more of the first through third aspects, the cell information comprises a neighbor cell information list, and wherein the first network node is a distributed unit and the second network node is a central unit. In a fifth aspect, alone or in combination with one or more of the first through fourth aspects, receiving the cell information comprises receiving the cell information via an F1 interface. In a sixth aspect, alone or in combination with one or more of the first through fifth aspects, the cell information comprises at least one of served cell information or neighbor information. In a seventh aspect, alone or in combination with one or more of the first through sixth aspects, receiving the cell information comprises receiving the cell information via an Xn interface. In an eighth aspect, alone or in combination with one or more of the first through seventh aspects, the cell information corresponds to at least one of a synchronization signal block or a transmission reception point.

In a ninth aspect, alone or in combination with one or more of the first through eighth aspects, the cell is associated with a fixed configuration, the fixed configuration corresponding to at least one of an SMTC window or a reception configuration window. In a tenth aspect, alone or in combination with the ninth aspect, the cell information indicates the fixed configuration. In an eleventh aspect, alone or in combination with the tenth aspect, receiving the cell information comprises receiving the cell information prior to the cell having a location proximate the first network node.

In a twelfth aspect, alone or in combination with one or more of the first through eleventh aspects, the cell is associated with a mobile termination function. In a thirteenth aspect, alone or in combination with one or more of the first through twelfth aspects, the mobile status information comprises an indication corresponding to a mobile backhaul configuration. In a fourteenth aspect, alone or in combination with the thirteenth aspect, the mobile status information comprises at least one of a measurement timing parameter or a synchronization signal block measurement timing configuration. In a fifteenth aspect, alone or in combination with one or more of the first through fourteenth aspects, the mobile status information corresponds to a common mobile configuration associated with the cell and at least one additional cell.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
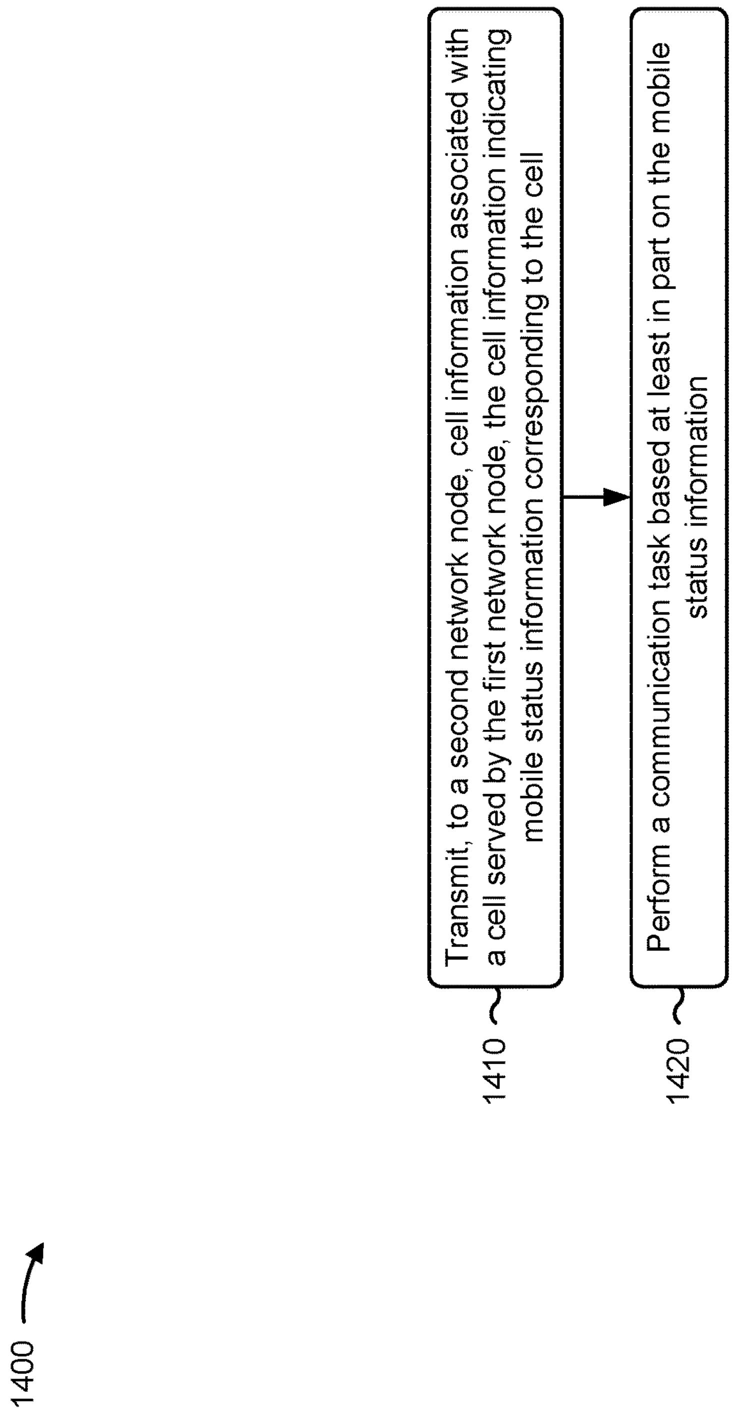

FIG. 14 is a diagram illustrating an example process 1400 performed, for example, by a first network node, in accordance with the present disclosure. Example process 1400 is an example where a first network node (e.g., network node 604) performs operations associated with measurement timing configuration indications between network nodes.

As shown in FIG. 14, in some aspects, process 1400 may include transmitting, to a second network node, cell information associated with a cell served by the first network node, the cell information indicating mobile status information corresponding to the cell (block 1410). For example, the first network node (e.g., using communication manager 2108 and/or transmission component 2104, depicted in FIG. 21) may transmit, to a second network node, cell information associated with a cell served by the first network node, the cell information indicating mobile status information corresponding to the cell, as described above, for example, with reference to FIG. 6.

As further shown in FIG. 14, in some aspects, process 1400 may include performing a communication task based at least in part on the mobile status information (block 1420). For example, the first network node (e.g., using communication manager 2108, reception component 2102, and/or transmission component 2104, depicted in FIG. 21) may perform a communication task based at least in part on the mobile status information, as described above, for example, with reference to FIG. 6.

Process 1400 may include additional aspects, such as any single aspect or any combination of aspects described below and/or in connection with one or more other processes described elsewhere herein.

In a first aspect, the mobile status information indicates that the cell is mobile. In a second aspect, alone or in combination with the first aspect, the mobile status information indicates that the cell is stationary. In a third aspect, alone or in combination with one or more of the first and second aspects, the cell information comprises served cell information, and wherein the first network node is a distributed unit and the second network node is a central unit. In a fourth aspect, alone or in combination with one or more of the first through third aspects, the cell information comprises a neighbor cell information list, and wherein the first network node is a central unit and the second network node is a distributed unit. In a fifth aspect, alone or in combination with one or more of the first through fourth aspects, transmitting the cell information comprises transmitting the cell information via an F1 interface. In a sixth aspect, alone or in combination with one or more of the first through fifth aspects, the cell information comprises at least one of served cell information or neighbor information. In a seventh aspect, alone or in combination with one or more of the first through sixth aspects, transmitting the cell information comprises transmitting the cell information via an Xn interface. In an eighth aspect, alone or in combination with one or more of the first through seventh aspects, the cell information corresponds to at least one of a synchronization signal block or a transmission reception point.

In a ninth aspect, alone or in combination with one or more of the first through eighth aspects, the cell is associated with a fixed configuration, the fixed configuration corresponding to at least one of an SMTC window or a reception configuration window. In a tenth aspect, alone or in combination with the ninth aspect, the cell information indicates the fixed configuration. In an eleventh aspect, alone or in combination with the tenth aspect, transmitting the cell information comprises transmitting the cell information prior to the cell having a location proximate the first network node.

In a twelfth aspect, alone or in combination with one or more of the first through eleventh aspects, the cell is associated with a mobile termination function. In a thirteenth aspect, alone or in combination with one or more of the first through twelfth aspects, the mobile status information comprises an indication corresponding to a mobile backhaul configuration. In a fourteenth aspect, alone or in combination with the thirteenth aspect, the mobile status information comprises at least one of a measurement timing parameter or a synchronization signal block measurement timing configuration. In a fifteenth aspect, alone or in combination with one or more of the first through fourteenth aspects, the mobile status information corresponds to a common mobile configuration associated with the cell and at least one additional cell.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
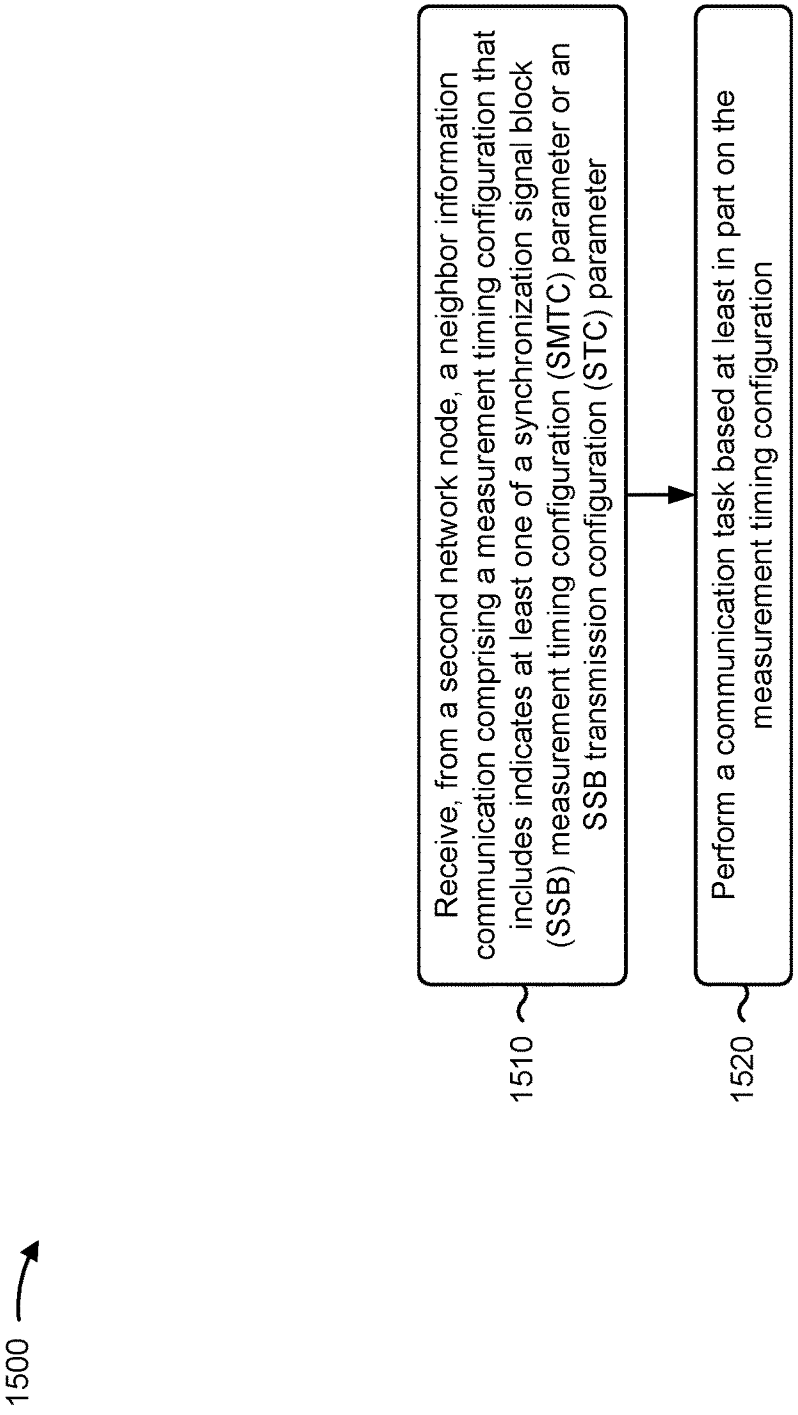

FIG. 15 is a diagram illustrating an example process 1500 performed, for example, by a first network node, in accordance with the present disclosure. Example process 1500 is an example where a first network node (e.g., network node 602) performs operations associated with measurement timing configuration indications between network nodes.

As shown in FIG. 15, in some aspects, process 1500 may include receiving, from a second network node, a neighbor information communication comprising a measurement timing configuration that includes indicates at least one of an SMTC parameter or an STC parameter (block 1510). For example, the first network node (e.g., using communication manager 2108 and/or reception component 2102, depicted in FIG. 21) may receive, from a second network node, a neighbor information communication comprising a measurement timing configuration that includes indicates at least one of an SMTC parameter or an STC parameter, as described above, for example, with reference to FIG. 6.

As further shown in FIG. 15, in some aspects, process 1500 may include performing a communication task based at least in part on the measurement timing configuration (block 1520). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 1500 may include additional aspects, such as any single aspect or any combination of aspects described below and/or in connection with one or more other processes described elsewhere herein.

In a first aspect, performing the communication task comprises negotiating one or more timing configurations between the first network node and at least one of the second network node or a third network node. In a second aspect, alone or in combination with the first aspect, the neighbor information communication comprises the STC parameter, and wherein the STC parameter indicates a timing configuration corresponding to a neighbor cell with respect to the second network node. In a third aspect, alone or in combination with the second aspect, the measurement timing configuration indication indicates the timing configuration. In a fourth aspect, alone or in combination with one or more of the second or third aspects, the measurement timing configuration indication comprises a request associated with the timing configuration.

In a fifth aspect, alone or in combination with the fourth aspect, the request comprises an implicit request based at least in part on the neighbor cell comprising a neighbor cell with respect to the second network node. In a sixth aspect, alone or in combination with the fourth aspect, the measurement timing configuration includes an explicit indication of the request. In a seventh aspect, alone or in combination with the sixth aspect, the explicit indication of the request comprises a dedicated indication flag.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
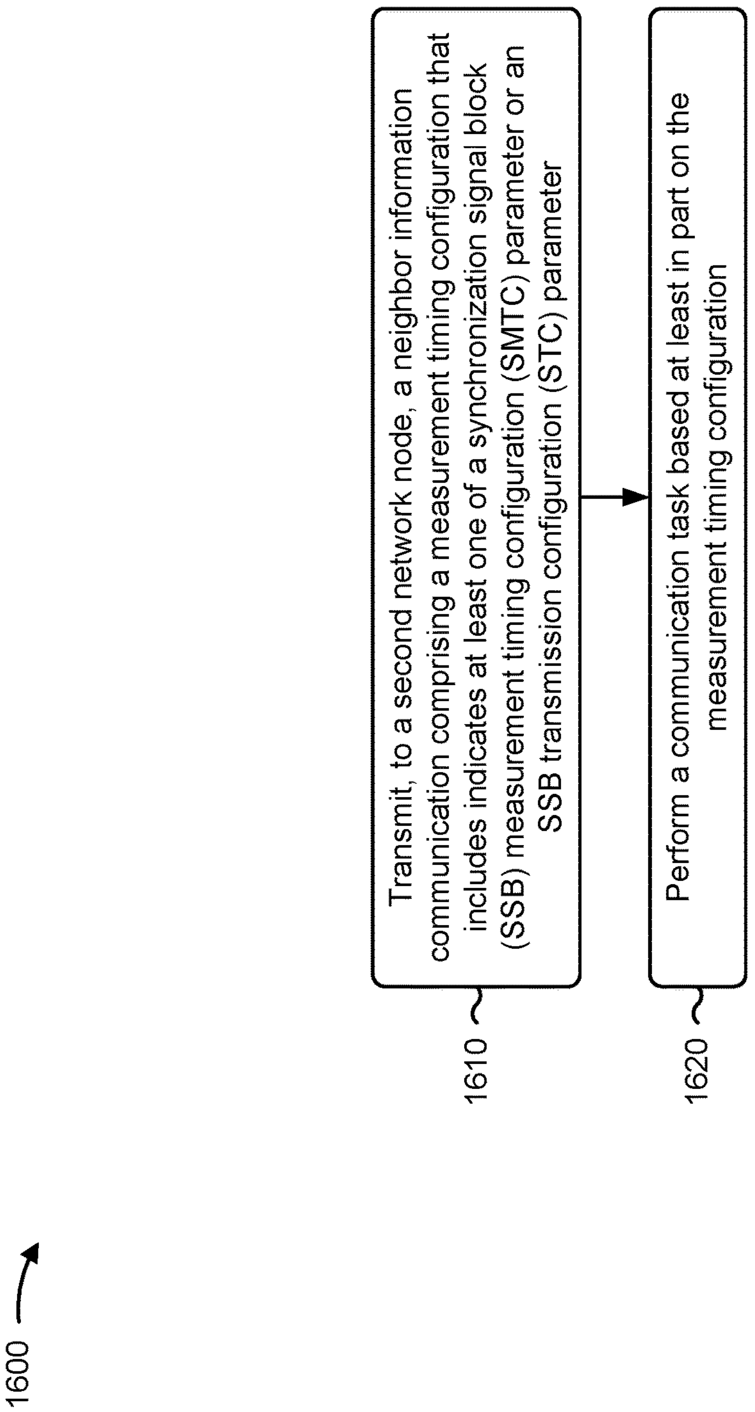

FIG. 16 is a diagram illustrating an example process 1600 performed, for example, by a first network node, in accordance with the present disclosure. Example process 1600 is an example where a first network node (e.g., network node 604) performs operations associated with measurement timing configuration indications between network nodes.

As shown in FIG. 16, in some aspects, process 1600 may include transmitting, to a second network node, a neighbor information communication comprising a measurement timing configuration that includes indicates at least one of an SMTC parameter or an STC parameter (block 1610). For example, the first network node (e.g., using communication manager 2108 and/or transmission component 2104, depicted in FIG. 21) may transmit, to a second network node, a neighbor information communication comprising a measurement timing configuration that includes indicates at least one of an SMTC parameter or an STC parameter, as described above, for example, with reference to FIG. 6.

As further shown in FIG. 16, in some aspects, process 1600 may include performing a communication task based at least in part on the measurement timing configuration (block 1620). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 1600 may include additional aspects, such as any single aspect or any combination of aspects described below and/or in connection with one or more other processes described elsewhere herein.

In a first aspect, performing the communication task comprises negotiating one or more timing configurations between the first network node and at least one of the second network node or a third network node. In a second aspect, alone or in combination with the first aspect, the neighbor information communication comprises the STC parameter, and wherein the STC parameter indicates a timing configuration corresponding to a neighbor cell with respect to the first network node. In a third aspect, alone or in combination with the second aspect, the measurement timing configuration indication indicates the timing configuration.

In a fourth aspect, alone or in combination with one or more of the first through third aspects, the measurement timing configuration indication comprises a request associated with the timing configuration. In a fifth aspect, alone or in combination with the fourth aspect, the request comprises an implicit request based at least in part on the neighbor cell comprising a neighbor cell with respect to the first network node. In a sixth aspect, alone or in combination the fourth aspect, the measurement timing configuration includes an explicit indication of the request. In a seventh aspect, alone or in combination with the sixth aspect, the explicit indication of the request comprises a dedicated indication flag.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
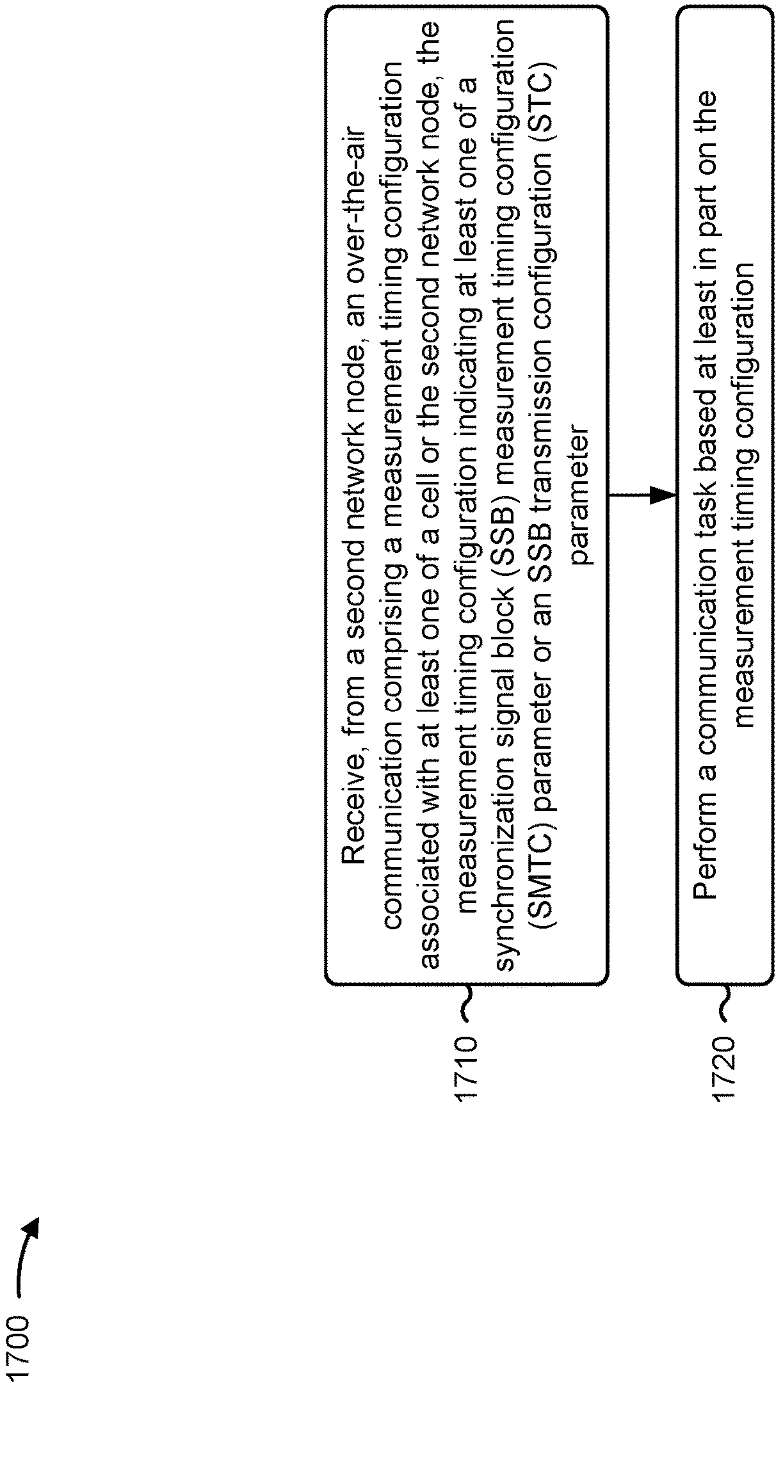

FIG. 17 is a diagram illustrating an example process 1700 performed, for example, by a first network node, in accordance with the present disclosure. Example process 1700 is an example where a first network node (e.g., network node 602) performs operations associated with measurement timing configuration indications between network nodes.

As shown in FIG. 17, in some aspects, process 1700 may include receiving, from a second network node, an over-the-air communication comprising a measurement timing configuration associated with at least one of a cell or the second network node, the measurement timing configuration indicating at least one of an SMTC parameter or an STC parameter (block 1710). For example, the first network node (e.g., using communication manager 2108 and/or reception component 2102, depicted in FIG. 21) may receive, from a second network node, an over-the-air communication comprising a measurement timing configuration associated with at least one of a cell or the second network node, the measurement timing configuration indicating at least one of an SMTC parameter or an STC parameter, as described above, for example, with reference to FIG. 6.

As further shown in FIG. 17, in some aspects, process 1700 may include performing a communication task based at least in part on the measurement timing configuration (block 1720). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 1700 may include additional aspects, such as any single aspect or any combination of aspects described below and/or in connection with one or more other processes described elsewhere herein.

In a first aspect, the second network node comprises at least one of a distributed unit or a mobile termination function. In a second aspect, alone or in combination with the first aspect, receiving the over-the-air communication comprises receiving a broadcast signal. In a third aspect, alone or in combination with one or more of the first and second aspects, the cell comprises a neighbor cell with respect to the second network node. In a fourth aspect, alone or in combination with one or more of the first through third aspects, the first network node comprises a distributed unit and the second network node comprises a central unit. In a fifth aspect, alone or in combination with one or more of the first through fourth aspects, the second network node comprises a distributed unit and the first network node comprises a central unit.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
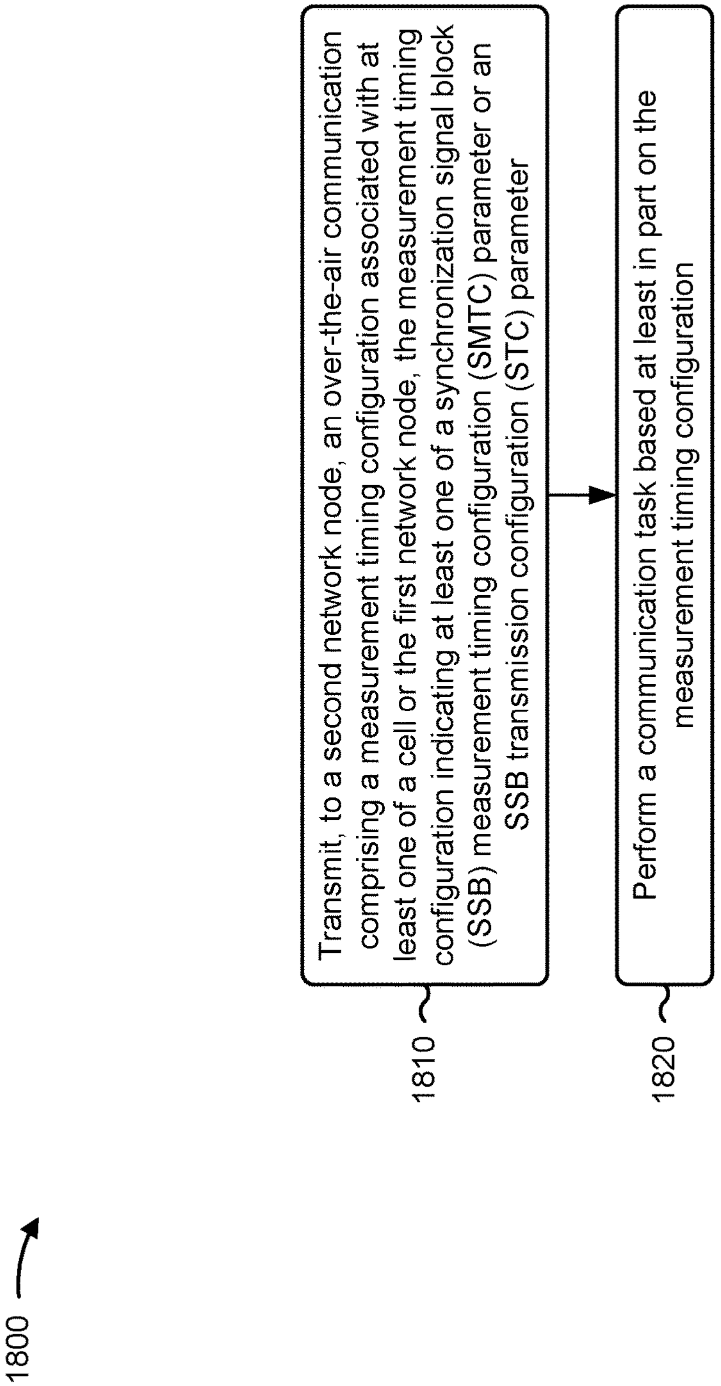

FIG. 18 is a diagram illustrating an example process 1800 performed, for example, by a first network node, in accordance with the present disclosure. Example process 1800 is an example where a first network node (e.g., network node 604) performs operations associated with measurement timing configuration indications between network nodes.

As shown in FIG. 18, in some aspects, process 1800 may include transmitting, to a second network node, an over-the-air communication comprising a measurement timing configuration associated with at least one of a cell or the first network node, the measurement timing configuration indicating at least one of an SMTC parameter or an STC parameter (block 1810). For example, the first network node (e.g., using communication manager 2108 and/or transmission component 2104, depicted in FIG. 21) may transmit, to a second network node, an over-the-air communication comprising a measurement timing configuration associated with at least one of a cell or the first network node, the measurement timing configuration indicating at least one of an SMTC parameter or an STC parameter, as described above, for example, with reference to FIG. 6.

As further shown in FIG. 18, in some aspects, process 1800 may include performing a communication task based at least in part on the measurement timing configuration (block 1820). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 1800 may include additional aspects, such as any single aspect or any combination of aspects described below and/or in connection with one or more other processes described elsewhere herein.

In a first aspect, the first network node comprises at least one of a distributed unit or a mobile termination function. In a second aspect, alone or in combination with the first aspect, transmitting the over-the-air communication comprises transmitting a broadcast signal. In a third aspect, alone or in combination with one or more of the first and second aspects, the cell comprises a neighbor cell with respect to the first network node. In a fourth aspect, alone or in combination with one or more of the first through third aspects, the first network node comprises a central unit and the second network node comprises a distributed unit. In a fifth aspect, alone or in combination with one or more of the first through fourth aspects, the second network node comprises a distributed unit and the first network node comprises a central unit.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
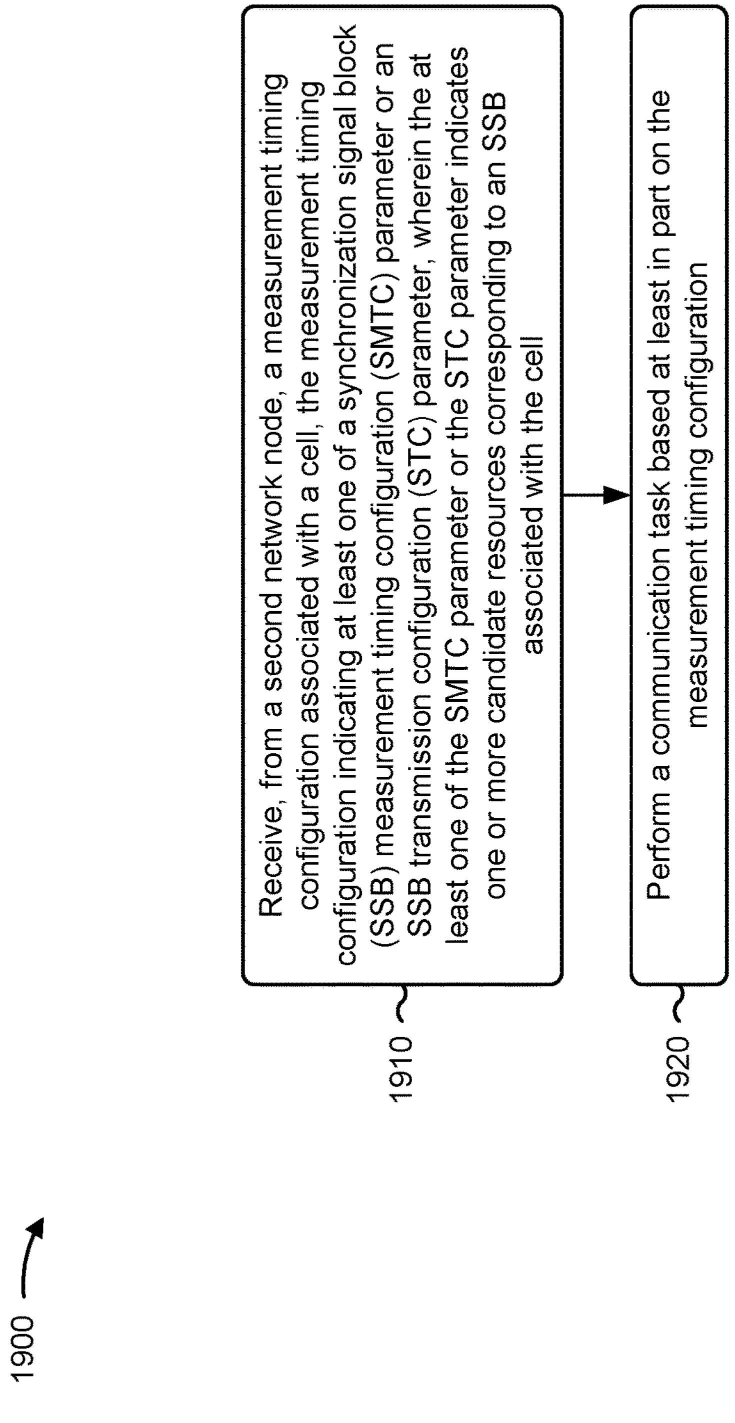

FIG. 19 is a diagram illustrating an example process 1900 performed, for example, by a first network node, in accordance with the present disclosure. Example process 1900 is an example where a first network node (e.g., network node 602) performs operations associated with measurement timing configuration indications between network nodes.

As shown in FIG. 19, in some aspects, process 1900 may include receiving, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell (block 1910). For example, the first network node (e.g., using communication manager 2108 and/or reception component 2102, depicted in FIG. 21) may receive, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell, as described above, for example, with reference to FIG. 6.

As further shown in FIG. 19, in some aspects, process 1900 may include performing a communication task based at least in part on the measurement timing configuration (block 1920). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 1900 may include additional aspects, such as any single aspect or any combination of aspects described below and/or in connection with one or more other processes described elsewhere herein.

In a first aspect, the one or more candidate resources include at least one of an uplink resource or a downlink resource. In a second aspect, alone or in combination with the first aspect, process 1900 includes receiving an indication of a muting pattern associated with the SSB. In a third aspect, alone or in combination with one or more of the first or second aspects, the indication of the muting pattern comprises at least one of a bitmap, a scaling factor, or an offset. In a fourth aspect, alone or in combination with one or more of the second or third aspects, receiving the measurement timing configuration comprises receiving the measurement timing configuration via a first communication interface, and receiving the indication of the muting pattern comprises receiving the indication of the muting pattern via a second communication interface that is different from the first communication interface. In a fifth aspect, alone or in combination with the fourth aspect, the second communication interface comprises an over-the-air communication interface.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
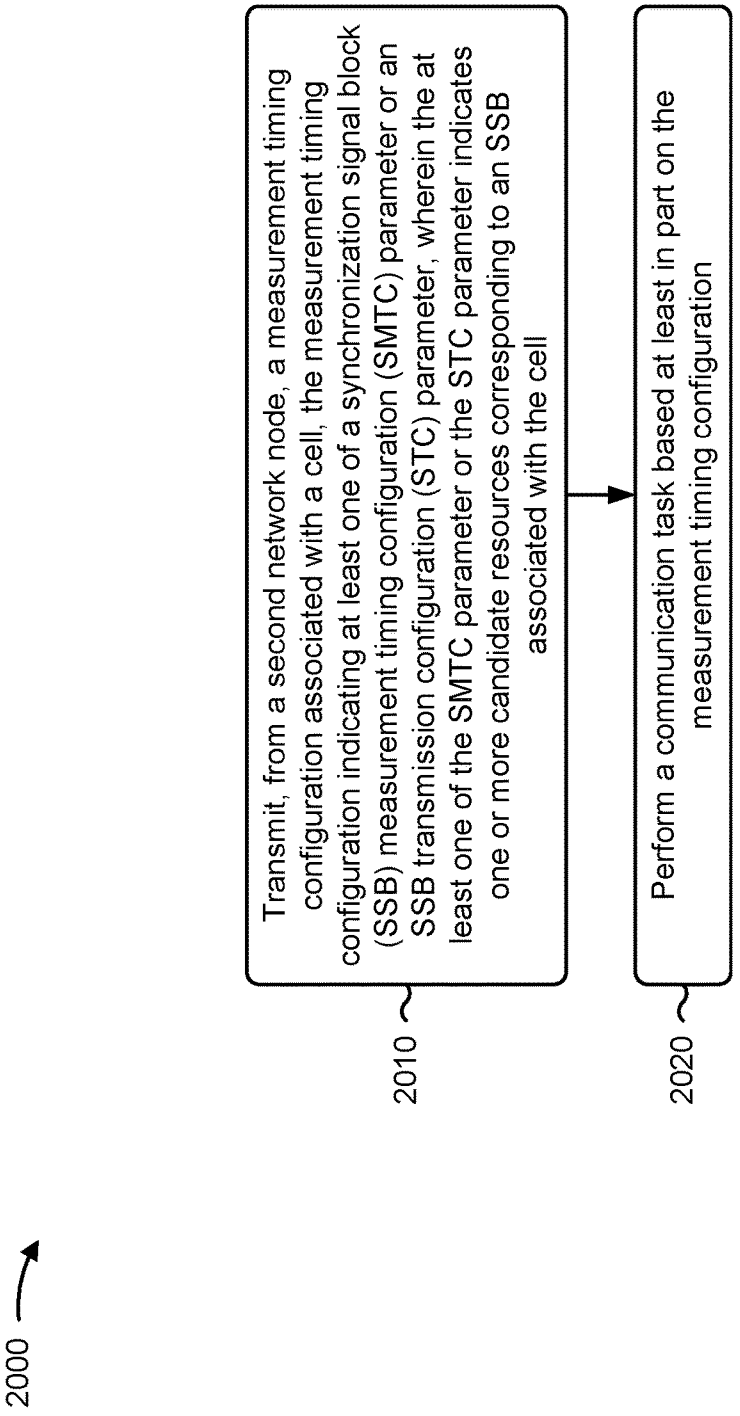

FIG. 20 is a diagram illustrating an example process 2000 performed, for example, by a first network node, in accordance with the present disclosure. Example process 2000 is an example where a first network node (e.g., network node 604) performs operations associated with measurement timing configuration indications between network nodes.

As shown in FIG. 20, in some aspects, process 2000 may include transmitting, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell (block 2010). For example, the first network node (e.g., using communication manager 2108 and/or transmission component 2104, depicted in FIG. 21) may transmit, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell, as described above, for example, with reference to FIG. 6.

As further shown in FIG. 20, in some aspects, process 2000 may include performing a communication task based at least in part on the measurement timing configuration (block 2020). For example, the first network node (e.g., using communication manager 2108, reception component 2102, and/or transmission component 2104, depicted in FIG. 21) may perform a communication task based at least in part on the measurement timing configuration, as described above, for example, with reference to FIG. 6.

Process 2000 may include additional aspects, such as any single aspect or any combination of aspects described below and/or in connection with one or more other processes described elsewhere herein.

In a first aspect, the one or more candidate resources include at least one of an uplink resource or a downlink resource. In a second aspect, alone or in combination with the first aspect, process 2000 includes transmitting an indication of a muting pattern associated with the SSB. In a third aspect, alone or in combination with one or more of the first or second aspects, the indication of the muting pattern comprises at least one of a bitmap, a scaling factor, or an offset. In a fourth aspect, alone or in combination with one or more of the second or third aspects, transmitting the measurement timing configuration comprises transmitting the measurement timing configuration via a first communication interface, and transmitting the indication of the muting pattern comprises transmitting the indication of the muting pattern via a second communication interface that is different from the first communication interface. In a fifth aspect, alone or in combination with the fourth aspect, the second communication interface comprises an OTA communication interface.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
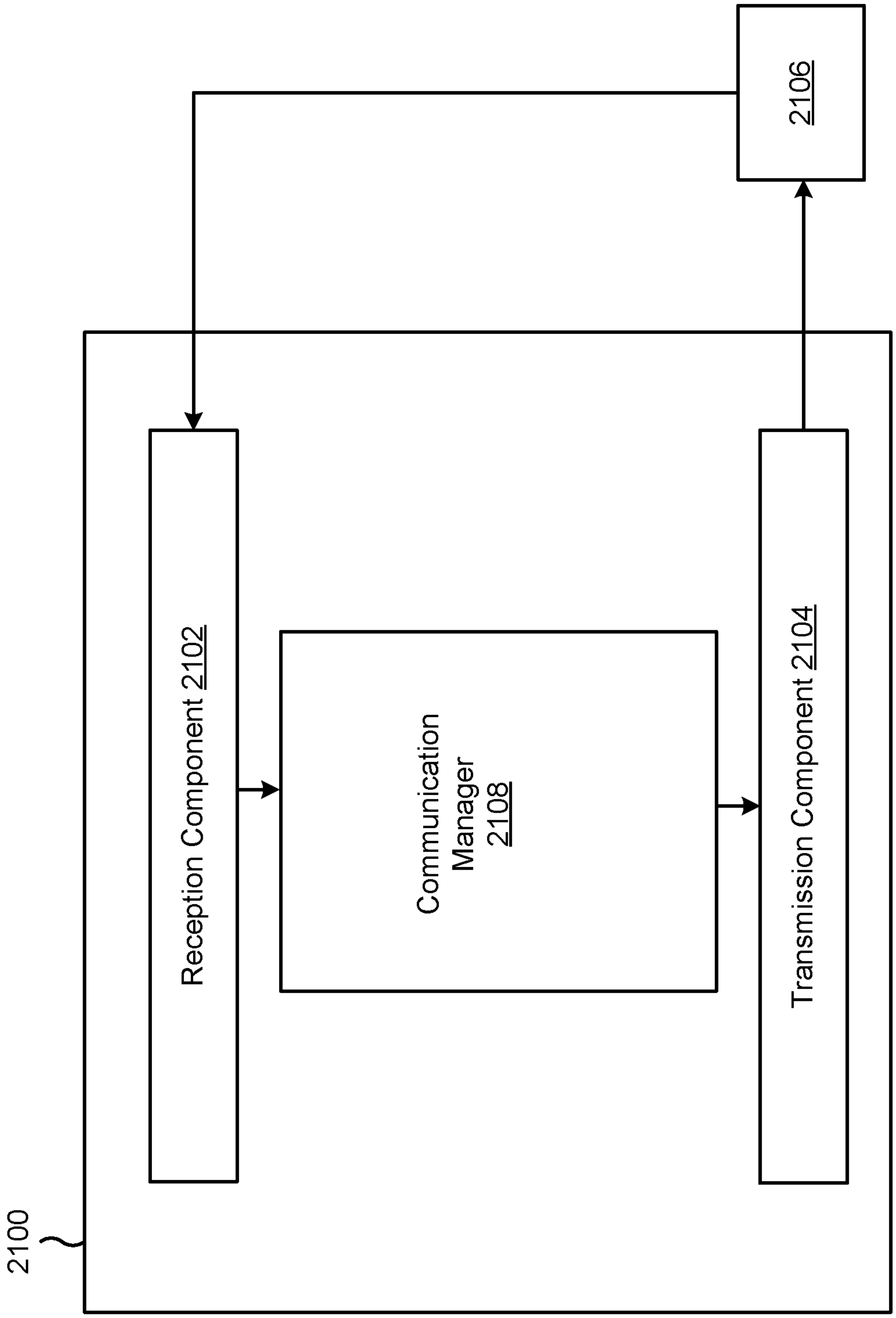
FIG. 21 is a diagram of an example apparatus for wireless communication, in accordance with the present disclosure.

FIG. 21 is a diagram of an example apparatus 2100 for wireless communication. The apparatus 2100 may be a network node, or a network node may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 2108.

In some aspects, the apparatus 2100 may be configured to perform one or more operations described herein in connection with FIG. 6. Additionally, or alternatively, the apparatus 2100 may be configured to perform one or more processes described herein, such as process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, process 1900 of FIG. 19, process 2000 of FIG. 20, or a combination thereof. In some aspects, the apparatus 2100 and/or one or more components shown in FIG. 21 may include one or more components of the UE and/or the base station described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the UE and/or the base station described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of the UE and/or the base station described in connection with FIG. 2. In some aspects, the transmission component 2104 may be co-located with the reception component 2102 in a transceiver.

The reception component 2102 may receive, from a second network node, a neighbor information communication comprising a measurement timing configuration indication associated with a cell served by the first network node, the cell having a first cell configuration. The communication manager 2108, the reception component 2102, and/or the transmission component 2104 may apply a second configuration to the cell based at least in part on the measurement timing configuration indication. In some aspects, the communication manager 2108 may include one or more antennas, a modem, a modulator, a transmit MIMO processor, a transmit processor, a controller/processor, a memory, or a combination thereof, of the UE and/or the base station described in connection with FIG. 2. In some aspects, the communication manager 2108 may include the reception component 2102 and/or the transmission component 2104.

The transmission component 2104 may transmit, to a second network node, a neighbor information communication comprising a measurement timing configuration indication associated with a cell served by the second network node, the cell having a first cell configuration, wherein the measurement timing configuration indicates a second cell configuration. The communication manager 2108, the reception component 2102, and/or the transmission component 2104 may perform a communication task based at least in part on the second cell configuration.

The reception component 2102 may receive, from a second network node, a neighbor information communication comprising a measurement timing configuration that includes indicates at least one of an SMTC periodicity or a link type. The communication manager 2108, the reception component 2102, and/or the transmission component 2104 may perform a communication task based at least in part on the measurement timing configuration.

The transmission component 2104 may transmit, to a second network node, a neighbor information communication comprising a measurement timing configuration that includes indicates at least one of an SMTC periodicity or a link type. The communication manager 2108, the reception component 2102, and/or the transmission component 2104 may perform a communication task based at least in part on the measurement timing configuration.

The reception component 2102 may receive, from a second network node, cell direction information associated with a cell served by the first network node. The communication manager 2108, the reception component 2102, and/or the transmission component 2104 may perform a communication task based at least in part on the cell direction information.

The transmission component 2104 may transmit, to a second network node, cell direction information associated with a cell served by the second network node. The communication manager 2108, the reception component 2102, and/or the transmission component 2104 may perform a communication task based at least in part on the cell direction information.

The reception component 2102 may receive, from a second network node, cell information associated with a cell served by the second network node, the cell information indicating mobile status information corresponding to the cell. The communication manager 2108, the reception component 2102, and/or the transmission component 2104 may perform a communication task based at least in part on the mobile status information.

The transmission component 2104 may transmit, to a second network node, cell information associated with a cell served by the first network node, the cell information indicating mobile status information corresponding to the cell. The communication manager 2108, the reception component 2102, and/or the transmission component 2104 may perform a communication task based at least in part on the mobile status information.

The reception component 2102 may receive, from a second network node, a neighbor information communication comprising a measurement timing configuration that includes indicates at least one of an SMTC parameter or an STC parameter. The communication manager 2108, the reception component 2102, and/or the transmission component 2104 may perform a communication task based at least in part on the measurement timing configuration.

The transmission component 2104 may transmit, to a second network node, a neighbor information communication comprising a measurement timing configuration that includes indicates at least one of an SMTC parameter or an STC parameter. The communication manager 2108, the reception component 2102, and/or the transmission component 2104 may perform a communication task based at least in part on the measurement timing configuration.

The reception component 2102 may receive, from a second network node, an over-the-air communication comprising a measurement timing configuration associated with at least one of a cell or the second network node, the measurement timing configuration indicating at least one of an SMTC parameter or an STC parameter. The communication manager 2108, the reception component 2102, and/or the transmission component 2104 may perform a communication task based at least in part on the measurement timing configuration.

The transmission component 2104 may transmit, to a second network node, an over-the-air communication comprising a measurement timing configuration associated with at least one of a cell or the first network node, the measurement timing configuration indicating at least one of an SMTC parameter or an STC parameter. The communication manager 2108, the reception component 2102, and/or the transmission component 2104 may perform a communication task based at least in part on the measurement timing configuration.

The reception component 2102 may receive, from a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell. The communication manager 2108, the reception component 2102, and/or the transmission component 2104 may perform a communication task based at least in part on the measurement timing configuration. The reception component 2102 may receive an indication of a muting pattern associated with the SSB.

The transmission component 2104 may transmit, to a second network node, a measurement timing configuration associated with a cell, the measurement timing configuration indicating at least one of an SMTC parameter or an STC parameter, wherein the at least one of the SMTC parameter or the STC parameter indicates one or more candidate resources corresponding to an SSB associated with the cell. The communication manager 2108, the reception component 2102, and/or the transmission component 2104 may perform a communication task based at least in part on the measurement timing configuration. The transmission component 2104 may transmit an indication of a muting pattern associated with the SSB.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

The following provides an overview of some Aspects of the present disclosure:

Aspect 1: A method of wireless communication performed by a first network node, comprising: receiving, from a second network node, a neighbor information communication comprising a measurement timing configuration indication associated with a cell served by the first network node, the cell having a first cell configuration; and applying a second configuration to the cell based at least in part on the measurement timing configuration indication.

Aspect 2: The method of Aspect 1, wherein the measurement timing configuration indication indicates the second configuration.

Aspect 3: The method of either of Aspects 1 or 2, wherein the measurement timing configuration indication comprises a request associated with the second configuration.

Aspect 4: The method of Aspect 3, wherein the request comprises an implicit request based at least in part on the cell comprising a neighbor cell with respect to the second network node.

Aspect 5: The method of Aspect 3, wherein the measurement timing configuration indication includes an explicit indication of the request.

Aspect 6: The method of Aspect 5, wherein the explicit indication of the request comprises a dedicated indication flag.

Aspect 7: A method of wireless communication performed by a first network node, comprising: transmitting, to a second network node, a neighbor information communication comprising a measurement timing configuration indication associated with a cell served by the second network node, the cell having a first cell configuration, wherein the measurement timing configuration indicates a second cell configuration; and performing a communication task based at least in part on the second cell configuration.

Aspect 8: The method of Aspect 7, wherein the measurement timing configuration indication indicates the second configuration.

Aspect 9: The method of either of Aspects 7 or 8, wherein the measurement timing configuration indication comprises a request associated with the second configuration.

Aspect 10: The method of Aspect 9, wherein the request comprises an implicit request based at least in part on the cell comprising a neighbor cell with respect to the second network node.

Aspect 11: The method of Aspect 9, wherein the measurement timing configuration indication includes an explicit indication of the request.

Aspect 12: The method of Aspect 11, wherein the explicit indication of the request comprises a dedicated indication flag.

Aspect 13: A method of wireless communication performed by a first network node, comprising: receiving, from a second network node, a neighbor information communication comprising a measurement timing configuration that includes indicates at least one of a synchronization signal block measurement timing configuration (SMTC) periodicity or a link type; and performing a communication task based at least in part on the measurement timing configuration.

Aspect 14: The method of Aspect 13, wherein the SMTC configuration indicates an SMTC periodicity corresponding to an integrated access and backhaul mobile termination function.

Aspect 15: The method of Aspect 14, wherein the SMTC periodicity is greater than a user equipment SMTC periodicity.

Aspect 16: The method of any of Aspects 13-15, wherein the link type comprises a backhaul link type or an access link type.

Aspect 17: The method of Aspect 16, wherein the measurement timing configuration comprises a dedicated indication flag corresponding to the link type.

Aspect 18: A method of wireless communication performed by a first network node, comprising: transmitting, to a second network node, a neighbor information communication comprising a measurement timing configuration that includes indicates at least one of a synchronization signal block measurement timing configuration (SMTC) periodicity or a link type; and performing a communication task based at least in part on the measurement timing configuration.

Aspect 19: The method of Aspect 18, wherein the SMTC configuration indicates an SMTC periodicity corresponding to an integrated access and backhaul mobile termination function.

Aspect 20: The method of Aspect 19, wherein the SMTC periodicity is greater than a user equipment SMTC periodicity.

Aspect 21: The method of any of Aspects 18-20, wherein the link type comprises a backhaul link type or an access link type.

Aspect 22: The method of Aspect 21, wherein the measurement timing configuration comprises a dedicated indication flag corresponding to the link type.

Aspect 23: A method of wireless communication performed by a first network node, comprising: receiving, from a second network node, cell direction information associated with a cell served by the first network node; and performing a communication task based at least in part on the cell direction information.

Aspect 24: The method of Aspect 23, wherein the first network node comprises a first central unit and the second network node comprises a second central unit.

Aspect 25: The method of Aspect 24, wherein receiving the cell direction information comprises receiving the cell direction information via an Xn interface.

Aspect 26: The method of either of Aspects 24 or 25, wherein the cell direction information is indicated in a served cell information field.

Aspect 27: The method of any of Aspects 24-26, wherein the cell direction information is indicated in a neighbor information field.

Aspect 28: The method of any of Aspects 24-27, wherein receiving the cell direction information comprises receiving the cell direction information via an F1 interface.

Aspect 29: The method of any of Aspects 23-28, wherein the first network node comprises a central unit and the second network node comprises a distributed unit.

Aspect 30: The method of any of Aspects 23-29, wherein the cell direction information is indicated in a neighbor cell information list.

Aspect 31: The method of any of Aspects 23-30, wherein the cell direction information corresponds to at least one of a transmission reception point (TRP) or a beam.

Aspect 32: The method of Aspect 31, wherein the cell direction information indicates only one direction corresponding to the at least one of the TRP or the beam.

Aspect 33: The method of Aspect 32, wherein the cell direction information indicates only one direction corresponding to a resource associated with the at least one of the TRP or the beam.

Aspect 34: The method of any of Aspects 23-33, wherein the cell direction information indicates direction information associated with at least one of a synchronization signal block (SSB) or an SSB area.

Aspect 35: The method of Aspect 34, wherein the cell direction information comprises a measurement timing indicator corresponding to at least one of an SSB index, an SSB transmission configuration (STC) parameter, or an SSB measurement timing configuration (SMTC) parameter.

Aspect 36: The method of Aspect 35, wherein the SMTC parameter indicates an STC window.

Aspect 37: The method of either of Aspects 35 or 36, wherein the SMTC parameter indicates an SMTC window.

Aspect 38: The method of Aspect 37, wherein the SMTC window is associated only with one cell direction.

Aspect 39: The method of any of Aspects 23-38, wherein the cell direction information indicates direction information associated with at least a specified portion of a bandwidth.

Aspect 40: The method of any of Aspects 23-39, wherein the cell direction information corresponds to a specified set resources blocks.

Aspect 41: A method of wireless communication performed by a first network node, comprising: transmitting, to a second network node, cell direction information associated with a cell served by the second network node; and performing a communication task based at least in part on the cell direction information.

Aspect 42: The method of Aspect 41, wherein the first network node comprises a first central unit and the second network node comprises a second central unit.

Aspect 43: The method of Aspect 42, wherein transmitting the cell direction information comprises transmitting the cell direction information via an Xn interface.

Aspect 44: The method of either of Aspects 42 or 43, wherein the cell direction information is indicated in a served cell information field.

Aspect 45: The method of any of Aspects 42-44, wherein the cell direction information is indicated in a neighbor information field.

Aspect 46: The method of any of Aspects 42-45, wherein receiving the cell direction information comprises receiving the cell direction information via an F1 interface.

Aspect 47: The method of any of Aspects 41-46, wherein the first network node comprises a distributed unit and the second network node comprises a central unit.

Aspect 48: The method of any of Aspects 41-47, wherein the cell direction information is indicated in a neighbor cell information list.

Aspect 49: The method of any of Aspects 41-48, wherein the cell direction information corresponds to at least one of a transmission reception point (TRP) or a beam.

Aspect 50: The method of Aspect 49, wherein the cell direction information indicates only one direction corresponding to the at least one of the TRP or the beam.

Aspect 51: The method of Aspect 50, wherein the cell direction information indicates only one direction corresponding to a resource associated with the at least one of the TRP or the beam.

Aspect 52: The method of any of Aspects 41-51, wherein the cell direction information indicates direction information associated with at least one of a synchronization signal block (SSB) or an SSB area.

Aspect 53: The method of Aspect 52, wherein the cell direction information comprises a measurement timing indicator corresponding to at least one of an SSB index, an SSB transmission configuration (STC) parameter, or an SSB measurement timing configuration (SMTC) parameter.

Aspect 54: The method of Aspect 53, wherein the SMTC parameter indicates an STC window.

Aspect 55: The method of either of Aspects 53 or 54, wherein the SMTC parameter indicates an SMTC window.

Aspect 56: The method of Aspect 55, wherein the SMTC window is associated only with one cell direction.

Aspect 57: The method of any of Aspects 41-56, wherein the cell direction information indicates direction information associated with at least a specified portion of a bandwidth.

Aspect 58: The method of any of Aspects 41-57, wherein the cell direction information corresponds to a specified set resources blocks.

Aspect 59: A method of wireless communication performed by a first network node, comprising: receiving, from a second network node, cell information associated with a cell served by the second network node, the cell information indicating mobile status information corresponding to the cell; and performing a communication task based at least in part on the mobile status information.

Aspect 60: The method of Aspect 59, wherein the mobile status information indicates that the cell is mobile.

Aspect 61: The method of Aspect 59, wherein the mobile status information indicates that the cell is stationary.

Aspect 62: The method of any of Aspects 59-61, wherein the cell information comprises served cell information, and wherein the first network node is a central unit and the second network node is a distributed unit.

Aspect 63: The method of any of Aspects 59-61, wherein the cell information comprises a neighbor cell information list, and wherein the first network node is a distributed unit and the second network node is a central unit.

Aspect 64: The method of any of Aspects 59-63, wherein receiving the cell information comprises receiving the cell information via an F1 interface.

Aspect 65: The method of any of Aspects 59-64, wherein the cell information comprises at least one of served cell information or neighbor information.

Aspect 66: The method of any of Aspects 59-65, wherein receiving the cell information comprises receiving the cell information via an Xn interface.

Aspect 67: The method of any of Aspects 59-66, wherein the cell information corresponds to at least one of a synchronization signal block or a transmission reception point.

Aspect 68: The method of any of Aspects 59-67, wherein the cell is associated with a fixed configuration, the fixed configuration corresponding to at least one of a synchronization signal block measurement time configuration (SMTC) window or a reception configuration window.

Aspect 69: The method of Aspect 68, wherein the cell information indicates the fixed configuration.

Aspect 70: The method of Aspect 69, wherein receiving the cell information comprises receiving the cell information prior to the cell having a location proximate the first network node.

Aspect 71: The method of any of Aspects 68-70, wherein the cell is associated with a mobile termination function.

Aspect 72: The method of any of Aspects 59-71, wherein the mobile status information comprises an indication corresponding to a mobile backhaul configuration.

Aspect 73: The method of Aspect 72, wherein the mobile status information comprises at least one of a measurement timing parameter or a synchronization signal block measurement timing configuration.

Aspect 74: The method of any of Aspects 59-73, wherein the mobile status information corresponds to a common mobile configuration associated with the cell and at least one additional cell.

Aspect 75: A method of wireless communication performed by a first network node, comprising: transmitting, to a second network node, cell information associated with a cell served by the first network node, the cell information indicating mobile status information corresponding to the cell; and performing a communication task based at least in part on the mobile status information.

Aspect 76: The method of Aspect 75, wherein the mobile status information indicates that the cell is mobile.

Aspect 77: The method of Aspect 75, wherein the mobile status information indicates that the cell is stationary.

Aspect 78: The method of any of Aspects 75-77, wherein the cell information comprises served cell information, and wherein the first network node is a distributed unit and the second network node is a central unit.

Aspect 79: The method of any of Aspects 75-77, wherein the cell information comprises a neighbor cell information list, and wherein the first network node is a central unit and the second network node is a distributed unit.

Aspect 80: The method of any of Aspects 75-79, wherein transmitting the cell information comprises transmitting the cell information via an F1 interface.

Aspect 81: The method of any of Aspects 75-80, wherein the cell information comprises at least one of served cell information or neighbor information.

Aspect 82: The method of any of Aspects 75-81, wherein transmitting the cell information comprises transmitting the cell information via an Xn interface.

Aspect 83: The method of any of Aspects 75-82, wherein the cell information corresponds to at least one of a synchronization signal block or a transmission reception point.

Aspect 84: The method of any of Aspects 75-83, wherein the cell is associated with a fixed configuration, the fixed configuration corresponding to at least one of a synchronization signal block measurement time configuration (SMTC) window or a reception configuration window.

Aspect 85: The method of Aspect 84, wherein the cell information indicates the fixed configuration.

Aspect 86: The method of Aspect 85, wherein transmitting the cell information comprises transmitting the cell information prior to the cell having a location proximate the first network node.

Aspect 87: The method of any of Aspects 84-86, wherein the cell is associated with a mobile termination function.

Aspect 88: The method of any of Aspects 75-87, wherein the mobile status information comprises an indication corresponding to a mobile backhaul configuration.

Aspect 89: The method of Aspect 88, wherein the mobile status information comprises at least one of a measurement timing parameter or a synchronization signal block measurement timing configuration.

Aspect 90: The method of any of Aspects 75-89, wherein the mobile status information corresponds to a common mobile configuration associated with the cell and at least one additional cell.

Aspect 91: A method of wireless communication performed by a first network node, comprising: receiving, from a second network node, a neighbor information communication comprising a measurement timing configuration that includes indicates at least one of a synchronization signal block (SSB) measurement timing configuration (SMTC) parameter or an SSB transmission configuration (STC) parameter; and performing a communication task based at least in part on the measurement timing configuration.

Aspect 92: The method of Aspect 91, wherein performing the communication task comprises negotiating one or more timing configurations between the first network node and at least one of the second network node or a third network node.

Aspect 93: The method of either of Aspects 91 or 92, wherein the neighbor information communication comprises the STC parameter, and wherein the STC parameter indicates a timing configuration corresponding to a neighbor cell with respect to the second network node.

Aspect 94: The method of Aspect 93, wherein the measurement timing configuration indication indicates the timing configuration.

Aspect 95: The method of either of Aspects 93 or 94, wherein the measurement timing configuration indication comprises a request associated with the timing configuration.

Aspect 96: The method of Aspect 95, wherein the request comprises an implicit request based at least in part on the neighbor cell comprising a neighbor cell with respect to the second network node.

Aspect 97: The method of Aspect 95, wherein the measurement timing configuration includes an explicit indication of the request.

Aspect 98: The method of Aspect 97, wherein the explicit indication of the request comprises a dedicated indication flag.

Aspect 99: A method of wireless communication performed by a first network node, comprising: transmitting, to a second network node, a neighbor information communication comprising a measurement timing configuration that includes indicates at least one of a synchronization signal block (SSB) measurement timing configuration (SMTC) parameter or an SSB transmission configuration (STC) parameter; and performing a communication task based at least in part on the measurement timing configuration.

Aspect 100: The method of Aspect 99, wherein performing the communication task comprises negotiating one or more timing configurations between the first network node and at least one of the second network node or a third network node.

Aspect 101: The method of either of Aspects 99 or 100, wherein the neighbor information communication comprises the STC parameter, and wherein the STC parameter indicates a timing configuration corresponding to a neighbor cell with respect to the first network node.

Aspect 102: The method of Aspect 101, wherein the measurement timing configuration indication indicates the timing configuration.

Aspect 103: The method of either of Aspects 101 or 102, wherein the measurement timing configuration indication comprises a request associated with the timing configuration.

Aspect 104: The method of Aspect 103, wherein the request comprises an implicit request based at least in part on the neighbor cell comprising a neighbor cell with respect to the first network node.

Aspect 105: The method of Aspect 103, wherein the measurement timing configuration includes an explicit indication of the request.

Aspect 106: The method of Aspect 105, wherein the explicit indication of the request comprises a dedicated indication flag.

Aspect 107: A method of wireless communication performed by a first network node, comprising: receiving, from a second network node, an over-the-air communication comprising a measurement timing configuration associated with at least one of a cell or the second network node, the measurement timing configuration indicating at least one of a synchronization signal block (SSB) measurement timing configuration (SMTC) parameter or an SSB transmission configuration (STC) parameter; and performing a communication task based at least in part on the measurement timing configuration.

Aspect 108: The method of Aspect 107, wherein the second network node comprises at least one of a distributed unit or a mobile termination function.

Aspect 109: The method of either of Aspects 107 or 108, wherein receiving the over-the-air communication comprises receiving a broadcast signal.

Aspect 110: The method of any of Aspects 107-109, wherein the cell comprises a neighbor cell with respect to the second network node.

Aspect 111: The method of any of Aspects 107-110, wherein the first network node comprises a distributed unit and the second network node comprises a central unit.

Aspect 112: The method of any of Aspects 107-110, wherein the second network node comprises a distributed unit and the first network node comprises a central unit.

Aspect 113: A method of wireless communication performed by a first network node, comprising: transmitting, to a second network node, an over-the-air communication comprising a measurement timing configuration associated with at least one of a cell or the first network node, the measurement timing configuration indicating at least one of a synchronization signal block (SSB) measurement timing configuration (SMTC) parameter or an SSB transmission configuration (STC) parameter; and performing a communication task based at least in part on the measurement timing configuration.

Aspect 114: The method of Aspect 113, wherein the first network node comprises at least one of a distributed unit or a mobile termination function.

Aspect 115: The method of either of Aspects 113 or 114, wherein transmitting the over-the-air communication comprises transmitting a broadcast signal.

Aspect 116: The method of any of Aspects 113-115, wherein the cell comprises a neighbor cell with respect to the first network node.

Aspect 117: The method of any of Aspects 113-116, wherein the first network node comprises a central unit and the second network node comprises a distributed unit.

Aspect 118: The method of any of Aspects 113-116, wherein the second network node comprises a distributed unit and the first network node comprises a central unit.

Aspect 119: A method of wireless communication performed by a first network node, comprising: receiving, from a second network node, a measurement timing configuration associated with a cell, the measurement timing configuration indicating at least one of a synchronization signal block (SSB) measurement timing configuration (SMTC) parameter or an SSB transmission configuration (STC) parameter, wherein the at least one of the SMTC parameter or the STC parameter indicates one or more candidate resources corresponding to an SSB associated with the cell; and performing a communication task based at least in part on the measurement timing configuration.

Aspect 120: The method of Aspect 119, wherein the one or more candidate resources include at least one of an uplink resource or a downlink resource.

Aspect 121: The method of either of Aspects 119 or 120, further comprising receiving an indication of a muting pattern associated with the SSB.

Aspect 122: The method of Aspect 121, wherein the indication of the muting pattern comprises at least one of a bitmap, a scaling factor, or an offset.

Aspect 123: The method of either of Aspects 121 or 122, wherein receiving the measurement timing configuration comprises receiving the measurement timing configuration via a first communication interface, and wherein receiving the indication of the muting pattern comprises receiving the indication of the muting pattern via a second communication interface that is different from the first communication interface.

Aspect 124: The method of Aspect 123, wherein the second communication interface comprises an over-the-air communication interface.

Aspect 125: A method of wireless communication performed by a first network node, comprising: transmitting, to a second network node, a measurement timing configuration associated with a cell, the measurement timing configuration indicating at least one of a synchronization signal block (SSB) measurement timing configuration (SMTC) parameter or an SSB transmission configuration (STC) parameter, wherein the at least one of the SMTC parameter or the STC parameter indicates one or more candidate resources corresponding to an SSB associated with the cell; and performing a communication task based at least in part on the measurement timing configuration.

Aspect 126: The method of Aspect 125, wherein the one or more candidate resources include at least one of an uplink resource or a downlink resource.

Aspect 127: The method of either of Aspects 125 or 126, further comprising transmitting an indication of a muting pattern associated with the SSB.

Aspect 128: The method of Aspect 127, wherein the indication of the muting pattern comprises at least one of a bitmap, a scaling factor, or an offset.

Aspect 129: The method of either of Aspects 127 or 128, wherein transmitting the measurement timing configuration comprises transmitting the measurement timing configuration via a first communication interface, and wherein transmitting the indication of the muting pattern comprises transmitting the indication of the muting pattern via a second communication interface that is different from the first communication interface.

Aspect 130: The method of Aspect 129, wherein the second communication interface comprises an over-the-air communication interface.

Aspect 131: An apparatus for wireless communication at a device, comprising a processor; memory coupled with the processor; and instructions stored in the memory and executable by the processor to cause the apparatus to perform the method of one or more of Aspects 1-6.

Aspect 132: A device for wireless communication, comprising a memory and one or more processors coupled to the memory, the one or more processors configured to perform the method of one or more of Aspects 1-6.

Aspect 133: An apparatus for wireless communication, comprising at least one means for performing the method of one or more of Aspects 1-6.

Aspect 134: A non-transitory computer-readable medium storing code for wireless communication, the code comprising instructions executable by a processor to perform the method of one or more of Aspects 1-6.

Aspect 135: A non-transitory computer-readable medium storing a set of instructions for wireless communication, the set of instructions comprising one or more instructions that, when executed by one or more processors of a device, cause the device to perform the method of one or more of Aspects 1-6.

Aspect 136: An apparatus for wireless communication at a device, comprising a processor; memory coupled with the processor; and instructions stored in the memory and executable by the processor to cause the apparatus to perform the method of one or more of Aspects 7-12.

Aspect 137: A device for wireless communication, comprising a memory and one or more processors coupled to the memory, the one or more processors configured to perform the method of one or more of Aspects 7-12.

Aspect 138: An apparatus for wireless communication, comprising at least one means for performing the method of one or more of Aspects 7-12.

Aspect 139: A non-transitory computer-readable medium storing code for wireless communication, the code comprising instructions executable by a processor to perform the method of one or more of Aspects 7-12.

Aspect 140: A non-transitory computer-readable medium storing a set of instructions for wireless communication, the set of instructions comprising one or more instructions that, when executed by one or more processors of a device, cause the device to perform the method of one or more of Aspects 7-12.

Aspect 141: An apparatus for wireless communication at a device, comprising a processor; memory coupled with the processor; and instructions stored in the memory and executable by the processor to cause the apparatus to perform the method of one or more of Aspects 13-17.

Aspect 142: A device for wireless communication, comprising a memory and one or more processors coupled to the memory, the one or more processors configured to perform the method of one or more of Aspects 13-17.

Aspect 143: An apparatus for wireless communication, comprising at least one means for performing the method of one or more of Aspects 13-17.

Aspect 144: A non-transitory computer-readable medium storing code for wireless communication, the code comprising instructions executable by a processor to perform the method of one or more of Aspects 13-17.

Aspect 145: A non-transitory computer-readable medium storing a set of instructions for wireless communication, the set of instructions comprising one or more instructions that, when executed by one or more processors of a device, cause the device to perform the method of one or more of Aspects 13-17.

Aspect 146: An apparatus for wireless communication at a device, comprising a processor; memory coupled with the processor; and instructions stored in the memory and executable by the processor to cause the apparatus to perform the method of one or more of Aspects 18-22.

Aspect 147: A device for wireless communication, comprising a memory and one or more processors coupled to the memory, the one or more processors configured to perform the method of one or more of Aspects 18-22.

Aspect 148: An apparatus for wireless communication, comprising at least one means for performing the method of one or more of Aspects 18-22.

Aspect 149: A non-transitory computer-readable medium storing code for wireless communication, the code comprising instructions executable by a processor to perform the method of one or more of Aspects 18-22.

Aspect 150: A non-transitory computer-readable medium storing a set of instructions for wireless communication, the set of instructions comprising one or more instructions that, when executed by one or more processors of a device, cause the device to perform the method of one or more of Aspects 18-22.

Aspect 151: An apparatus for wireless communication at a device, comprising a processor; memory coupled with the processor; and instructions stored in the memory and executable by the processor to cause the apparatus to perform the method of one or more of Aspects 23-40.

Aspect 152: A device for wireless communication, comprising a memory and one or more processors coupled to the memory, the one or more processors configured to perform the method of one or more of Aspects 23-40.

Aspect 153: An apparatus for wireless communication, comprising at least one means for performing the method of one or more of Aspects 23-40.

Aspect 154: A non-transitory computer-readable medium storing code for wireless communication, the code comprising instructions executable by a processor to perform the method of one or more of Aspects 23-40.

Aspect 155: A non-transitory computer-readable medium storing a set of instructions for wireless communication, the set of instructions comprising one or more instructions that, when executed by one or more processors of a device, cause the device to perform the method of one or more of Aspects 23-40.

Aspect 156: An apparatus for wireless communication at a device, comprising a processor; memory coupled with the processor; and instructions stored in the memory and executable by the processor to cause the apparatus to perform the method of one or more of Aspects 41-58.

Aspect 157: A device for wireless communication, comprising a memory and one or more processors coupled to the memory, the one or more processors configured to perform the method of one or more of Aspects 41-58.

Aspect 158: An apparatus for wireless communication, comprising at least one means for performing the method of one or more of Aspects 41-58.

Aspect 159: A non-transitory computer-readable medium storing code for wireless communication, the code comprising instructions executable by a processor to perform the method of one or more of Aspects 41-58.

Aspect 160: A non-transitory computer-readable medium storing a set of instructions for wireless communication, the set of instructions comprising one or more instructions that, when executed by one or more processors of a device, cause the device to perform the method of one or more of Aspects 41-58.

Aspect 161: An apparatus for wireless communication at a device, comprising a processor; memory coupled with the processor; and instructions stored in the memory and executable by the processor to cause the apparatus to perform the method of one or more of Aspects 59-74.

Aspect 162: A device for wireless communication, comprising a memory and one or more processors coupled to the memory, the one or more processors configured to perform the method of one or more of Aspects 59-74.

Aspect 163: An apparatus for wireless communication, comprising at least one means for performing the method of one or more of Aspects 59-74.

Aspect 164: A non-transitory computer-readable medium storing code for wireless communication, the code comprising instructions executable by a processor to perform the method of one or more of Aspects 59-74.

Aspect 165: A non-transitory computer-readable medium storing a set of instructions for wireless communication, the set of instructions comprising one or more instructions that, when executed by one or more processors of a device, cause the device to perform the method of one or more of Aspects 59-74.

Aspect 166: An apparatus for wireless communication at a device, comprising a processor; memory coupled with the processor; and instructions stored in the memory and executable by the processor to cause the apparatus to perform the method of one or more of Aspects 75-90.

Aspect 167: A device for wireless communication, comprising a memory and one or more processors coupled to the memory, the one or more processors configured to perform the method of one or more of Aspects 75-90.

Aspect 168: An apparatus for wireless communication, comprising at least one means for performing the method of one or more of Aspects 75-90.

Aspect 169: A non-transitory computer-readable medium storing code for wireless communication, the code comprising instructions executable by a processor to perform the method of one or more of Aspects 75-90.

Aspect 170: A non-transitory computer-readable medium storing a set of instructions for wireless communication, the set of instructions comprising one or more instructions that, when executed by one or more processors of a device, cause the device to perform the method of one or more of Aspects 75-90.

Aspect 171: An apparatus for wireless communication at a device, comprising a processor; memory coupled with the processor; and instructions stored in the memory and executable by the processor to cause the apparatus to perform the method of one or more of Aspects 91-98.

Aspect 172: A device for wireless communication, comprising a memory and one or more processors coupled to the memory, the one or more processors configured to perform the method of one or more of Aspects 91-98.

Aspect 173: An apparatus for wireless communication, comprising at least one means for performing the method of one or more of Aspects 91-98.

Aspect 174: A non-transitory computer-readable medium storing code for wireless communication, the code comprising instructions executable by a processor to perform the method of one or more of Aspects 91-98.

Aspect 175: A non-transitory computer-readable medium storing a set of instructions for wireless communication, the set of instructions comprising one or more instructions that, when executed by one or more processors of a device, cause the device to perform the method of one or more of Aspects 91-98.

Aspect 176: An apparatus for wireless communication at a device, comprising a processor; memory coupled with the processor; and instructions stored in the memory and executable by the processor to cause the apparatus to perform the method of one or more of Aspects 99-106.

Aspect 177: A device for wireless communication, comprising a memory and one or more processors coupled to the memory, the one or more processors configured to perform the method of one or more of Aspects 99-106.

Aspect 178: An apparatus for wireless communication, comprising at least one means for performing the method of one or more of Aspects 99-106.

Aspect 179: A non-transitory computer-readable medium storing code for wireless communication, the code comprising instructions executable by a processor to perform the method of one or more of Aspects 99-106.

Aspect 180: A non-transitory computer-readable medium storing a set of instructions for wireless communication, the set of instructions comprising one or more instructions that, when executed by one or more processors of a device, cause the device to perform the method of one or more of Aspects 99-106.

Aspect 181: An apparatus for wireless communication at a device, comprising a processor; memory coupled with the processor; and instructions stored in the memory and executable by the processor to cause the apparatus to perform the method of one or more of Aspects 107-112.

Aspect 182: A device for wireless communication, comprising a memory and one or more processors coupled to the memory, the one or more processors configured to perform the method of one or more of Aspects 107-112.

Aspect 183: An apparatus for wireless communication, comprising at least one means for performing the method of one or more of Aspects 107-112.

Aspect 184: A non-transitory computer-readable medium storing code for wireless communication, the code comprising instructions executable by a processor to perform the method of one or more of Aspects 107-112.

Aspect 185: A non-transitory computer-readable medium storing a set of instructions for wireless communication, the set of instructions comprising one or more instructions that, when executed by one or more processors of a device, cause the device to perform the method of one or more of Aspects 107-112.

Aspect 186: An apparatus for wireless communication at a device, comprising a processor; memory coupled with the processor; and instructions stored in the memory and executable by the processor to cause the apparatus to perform the method of one or more of Aspects 113-118.

Aspect 187: A device for wireless communication, comprising a memory and one or more processors coupled to the memory, the one or more processors configured to perform the method of one or more of Aspects 113-118.

Aspect 188: An apparatus for wireless communication, comprising at least one means for performing the method of one or more of Aspects 113-118.

Aspect 189: A non-transitory computer-readable medium storing code for wireless communication, the code comprising instructions executable by a processor to perform the method of one or more of Aspects 113-118.

Aspect 190: A non-transitory computer-readable medium storing a set of instructions for wireless communication, the set of instructions comprising one or more instructions that, when executed by one or more processors of a device, cause the device to perform the method of one or more of Aspects 113-118.

Aspect 191: An apparatus for wireless communication at a device, comprising a processor; memory coupled with the processor; and instructions stored in the memory and executable by the processor to cause the apparatus to perform the method of one or more of Aspects 119-124.

Aspect 192: A device for wireless communication, comprising a memory and one or more processors coupled to the memory, the one or more processors configured to perform the method of one or more of Aspects 119-124.

Aspect 193: An apparatus for wireless communication, comprising at least one means for performing the method of one or more of Aspects 119-124.

Aspect 194: A non-transitory computer-readable medium storing code for wireless communication, the code comprising instructions executable by a processor to perform the method of one or more of Aspects 119-124.

Aspect 195: A non-transitory computer-readable medium storing a set of instructions for wireless communication, the set of instructions comprising one or more instructions that, when executed by one or more processors of a device, cause the device to perform the method of one or more of Aspects 119-124.

Aspect 196: An apparatus for wireless communication at a device, comprising a processor; memory coupled with the processor; and instructions stored in the memory and executable by the processor to cause the apparatus to perform the method of one or more of Aspects 125-130.

Aspect 197: A device for wireless communication, comprising a memory and one or more processors coupled to the memory, the one or more processors configured to perform the method of one or more of Aspects 125-130.

Aspect 198: An apparatus for wireless communication, comprising at least one means for performing the method of one or more of Aspects 125-130.

Aspect 199: A non-transitory computer-readable medium storing code for wireless communication, the code comprising instructions executable by a processor to perform the method of one or more of Aspects 125-130.

Aspect 200: A non-transitory computer-readable medium storing a set of instructions for wireless communication, the set of instructions comprising one or more instructions that, when executed by one or more processors of a device, cause the device to perform the method of one or more of Aspects 125-130.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first network node, comprising:

receiving, from a second network node and via an Xn interface, cell information indicating a measurement timing parameter corresponding to a cell served by the second network node, indicating that the cell is mobile, and indicating a neighbor cell information list; and performing a communication task based at least in part on the cell information indicating that the cell is mobile.

2. The method of claim 1, further comprising:

receiving, from the second network node, cell information indicating that the cell is stationary.

3. The method of claim 2, wherein receiving the cell information indicating that the cell is stationary comprises receiving the cell information indicating that the cell is stationary via an F1 interface.

4. The method of claim 1, wherein the cell information comprises served cell information.

5. The method of claim 1, wherein the cell information corresponds to at least one of a synchronization signal block or a transmission reception point.

6. The method of claim 1, wherein the cell is associated with a fixed configuration, the fixed configuration corresponding to at least one of a synchronization signal block measurement time configuration (SMTC) window or a reception configuration window.

7. The method of claim 6, wherein the cell information indicates the fixed configuration.

8. The method of claim 7, wherein receiving the cell information comprises receiving the cell information prior to the cell having a location proximate to the first network node.

9. The method of claim 6, wherein the cell is associated with a mobile termination function.

10. The method of claim 1, wherein the cell information comprises an indication corresponding to a mobile backhaul configuration.

11. The method of claim 10, wherein the cell information comprises a synchronization signal block measurement timing configuration.

12. The method of claim 1, wherein the cell information corresponds to a common mobile configuration associated with the cell and at least one additional cell.

13. The method of claim 1, wherein the neighbor cell information list includes information indicating a resource associated with a beam.

14. The method of claim 1, wherein direction information is indicated in the neighbor cell information list, and wherein the direction information indicates a cell direction corresponding to a resource.

15. A first network node for wireless communication, comprising:

one or more memories; and one or more processors, coupled to the one or more memories, configured to cause the first network node to:

receive, from a second network node and via an Xn interface, cell information indicating a measurement timing parameter corresponding to a cell served by the second network node, indicating that the cell is mobile, and indicating a neighbor cell information list; and perform a communication task based at least in part on the cell information indicating that the cell is mobile.

16. The first network node of claim 15, wherein the one or more processors are configured to:

receive, from the second network node, cell information indicating that the cell is stationary.

17. The first network node of claim 16, wherein the one or more processors, to cause the first network node to receive the cell information indicating that the cell is stationary, are configured to cause the first network node to receive the cell information indicating that the cell is stationary via an F1 interface.

18. The first network node of claim 15, wherein the cell information comprises served cell information.

19. The first network node of claim 15, wherein the cell information corresponds to at least one of a synchronization signal block or a transmission reception point.

20. The first network node of claim 15, wherein the cell is associated with a fixed configuration, the fixed configuration corresponding to at least one of a synchronization signal block measurement time configuration (SMTC) window or a reception configuration window.

21. The first network node of claim 20, wherein the cell information indicates the fixed configuration.

22. The first network node of claim 21, wherein the one or more processors, to cause the first network node to receive the cell information, are configured to cause the first network node to receive the cell information prior to the cell having a location proximate to the first network node.

23. The first network node of claim 20, wherein the cell is associated with a mobile termination function.

24. The first network node of claim 15, wherein the cell information comprises an indication corresponding to a mobile backhaul configuration.

25. The first network node of claim 15, wherein the cell information comprises a synchronization signal block measurement timing configuration.

26. The first network node of claim 15, wherein the cell information corresponds to a common mobile configuration associated with the cell and at least one additional cell.

27. A non-transitory computer-readable medium storing a set of instructions for wireless communication, the set of instructions comprising:

one or more instructions that, when executed by one or more processors of a first network node, cause the first network node to:

receive, from a second network node and via an Xn interface, cell information indicating a measurement timing parameter corresponding to a cell served by the second network node, indicating that the cell is mobile, and indicating a neighbor cell information list; and perform a communication task based at least in part on the cell information indicating that the cell is mobile.

28. An apparatus for wireless communication, comprising:

means for receiving, from a second network node and via an Xn interface, cell information indicating a measurement timing parameter corresponding to a cell served by the second network node, indicating that the cell is mobile, and indicating a neighbor cell information list; and means for performing a communication task based at least in part on the cell information indicating that the cell is mobile.

29. The non-transitory computer-readable medium of claim 27, wherein the one or more instructions cause the first network node to:

receive, from the second network node, cell information indicating that the cell is stationary.

30. The non-transitory computer-readable medium of claim 29, wherein the one or more instructions, to receive the cell information indicating that the cell is stationary, cause the first network node to:

receive the cell information indicating that the cell is stationary via an F1 interface.

* * * * *